United States Patent
Jarvis et al.

(10) Patent No.: US 9,661,473 B1
(45) Date of Patent: May 23, 2017

(54) METHODS AND APPARATUS FOR DETERMINING LOCATIONS OF DEVICES IN CONFINED SPACES

(71) Applicant: QUALCOMM Incorporated, San Diego, CA (US)

(72) Inventors: Murray Jarvis, Cambridge (GB); Marko Velic, Cambridge (GB); Benjamin Tarlow, Cambridge (GB)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/185,393

(22) Filed: Jun. 17, 2016

(51) Int. Cl.
*H04W 4/04* (2009.01)

(52) U.S. Cl.
CPC .................................. *H04W 4/043* (2013.01)

(58) Field of Classification Search
CPC ........................................................ H04W 4/043
USPC ................................................ 455/456.1–457
See application file for complete search history.

(56) References Cited

U.S. PATENT DOCUMENTS

| | | | |
|---|---|---|---|
| 8,626,443 B2 * | 1/2014 | Robertson | G01C 21/00 701/532 |
| 8,879,426 B1 * | 11/2014 | Quilling | H04W 40/20 370/245 |
| 8,994,590 B2 | 3/2015 | Jarvis et al. | |
| 2007/0247366 A1 * | 10/2007 | Smith | G01S 5/021 342/464 |
| 2007/0270153 A1 * | 11/2007 | Lanzo | H04W 16/18 455/446 |
| 2013/0245933 A1 * | 9/2013 | Castaneda | G01C 21/206 701/445 |
| 2013/0331121 A1 | 12/2013 | Bandyopadhyay et al. | |
| 2014/0278054 A1 | 9/2014 | Tidd et al. | |
| 2015/0031390 A1 | 1/2015 | Robertson et al. | |
| 2015/0237595 A1 | 8/2015 | Le Grand et al. | |
| 2016/0033265 A1 | 2/2016 | Le Grand et al. | |
| 2016/0202341 A1 * | 7/2016 | Burgess | G01S 5/0252 342/452 |

OTHER PUBLICATIONS

Arulampalam M.S., et al., "A Tutorial on Particle Filters for Online Nonlinear/Non-Gaussian Bayesian Tracking," IEEE Transactions on Signal Processing, Feb. 2002, vol. 50, No. 2, pp. 174-188.

* cited by examiner

*Primary Examiner* — Sharad Rampuria
(74) *Attorney, Agent, or Firm* — Hunter Clark PLLC

(57) ABSTRACT

A location device (e.g., realized at one or more of a mobile device and/or a location server) includes a wireless transceiver, one or more location sensors and a floor-plan of a venue. The location device determines a plurality of hypothetical locations of a mobile device in the venue in response to data sets provided by the one or more location sensors. The data sets are associated with obstacle indication values calculated for the venue or for regions of the venue including locations corresponding to the data sets. The obstacle indication values indicate the proximity or orientation of the obstacle edges in the region or in the venue. The location device refines the one or more hypothetical locations based on the obstacle indication values to provide an estimate of the current location of the mobile device.

25 Claims, 12 Drawing Sheets

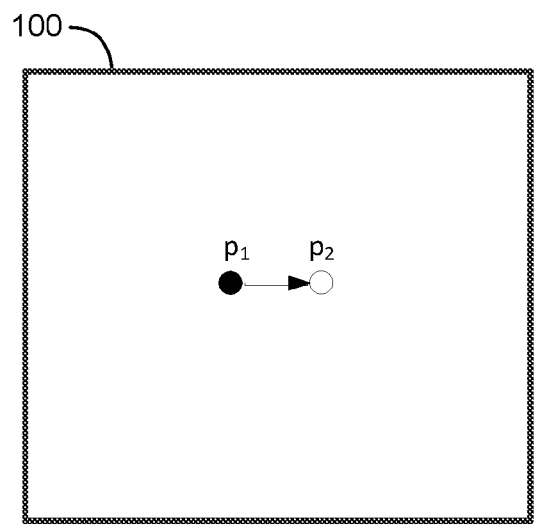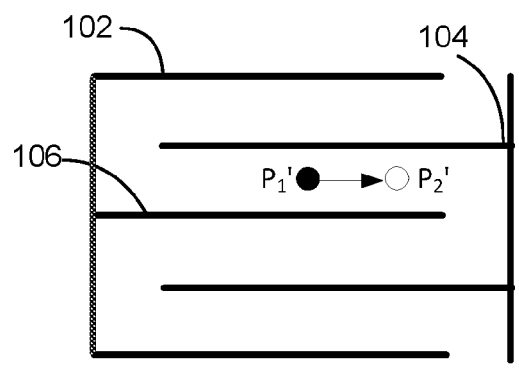
FIG. 1A                    FIG. 1B

METHODS AND APPARATUS FOR DETERMINING LOCATIONS OF DEVICES IN CONFINED SPACES

BACKGROUND

Methods for determining the location of objects in an outdoor environment with a clear view of the sky are well-known. Example methods can achieve a high degree of location accuracy using global navigation satellite systems (GNSS). Such a system may be implemented in a mobile device that processes a GNSS receiver configured to process signals received from multiple navigation satellites to determine its location based on trilateration using information encoded in the signals. GNSS systems, however, may not perform well in urban canyon environments due to multipath time delays resulting from satellite signals being reflected by buildings in the environment.

Locating an object in an indoor environment is typically more challenging as the signals from navigation satellites may not be able to be received in the indoor environment. Some indoor location systems use local radio sources, such as WiFi access points having known or fixed locations. Where the locations of the radio sources are known, the mobile device can determine its location with some degree of uncertainty using trilateration or by calculating a weighted centroid of the known locations of the RF sources each weighted by a value that depends on the strength of the signal received from the RF source. Where the locations of the radio sources are fixed, but possibly not known, the mobile device may determine its location using fingerprinting. This method correlates values of some feature of the received signals from multiple radio sources to a location on a floor-plan. The accuracy of indoor location systems suffers in venues including obstructions (such as people) that move and may distort the signals received by the mobile device.

Another method for determining location in an indoor venue employs pedestrian dead reckoning (PDR) sensors. These sensors, which may include, for example, accelerometers, gyroscopes, magnetometers and barometers, allow the mobile device to monitor changes in its location and, by combining these changes with a previously calculated location, to calculate a current location. Location systems based on PDR sensors tend to lose accuracy over longer terms of use due the inherent uncertainty of the sensors or due to sensor drift.

SUMMARY

An example location device is provided that includes a wireless transceiver, one or more location sensors and a stored floor-plan of a venue. The location device determines a plurality of hypothetical locations of a mobile device in the venue in response to data provided by the one or more location sensors. Each hypothetical location is associated with an obstacle indication value calculated for the venue as a whole or for a region of the venue including the hypothetical location. The obstacle indication values indicate the proximity or orientation of the obstacle edges in the region or in the venue. The location device processes the one or more hypothetical locations based on the obstacle indication values to provide an estimate of the current location of the mobile device.

In some variations, an example mobile device is provided that includes a processor, a wireless transceiver, and at least one location sensor including one or more of, for example, a global navigation satellite system (GNSS) receiver, the wireless transceiver, an infrared transceiver, an ultrasonic transceiver or a near-field communication (NFC) receiver, and/or one or more pedestrian dead reckoning (PDR) sensors. The mobile device also includes memory comprising a floor-plan of a venue. The processor is configured to obtain multiple location data sets representing respective different instants from the at least one location sensor of the mobile device, obtain a plurality of obstacle indication values, with each of the plurality of obstacle indication values, for each of the multiple location data sets, being derived from the floor-plan, determine a plurality of hypothetical locations of the mobile device in the venue based on the multiple location data sets, and determine a current location of the mobile device based on the plurality of hypothetical locations and the plurality of obstacle indication values.

Embodiments of the mobile device may include at least some of the features described in the present disclosure, including one or more of the following features.

The wireless transceiver may include one or more of, for example, a WiFi transceiver, a Bluetooth transceiver, an ultra-wideband (UWB) transceiver, a Zigbee transceiver, a near-field communication (NFC) transceiver, and/or a cellular transceiver.

The processor configured to determine the current location of the mobile device may be configured to apply a particle filter to a plurality of hypothetical states, with the plurality of hypothetical states including the plurality of hypothetical locations of the mobile device, generate a probability distribution over the plurality of hypothetical states and the plurality of obstacle indication values, and determine the current location of the mobile device from the generated probability distribution.

The plurality of obstacle indication values for the multiple location data sets may include respective mean-free-path (MFP) scores, determined based on the floor-plan, for the plurality of hypothetical locations, with each MFP score including a respective measure of proximity of at least some of obstacles in the floor-plan to a respective hypothetical location. The processor configured to apply the particle filter and determine the current location of the mobile device may be configured to determine an initial one of the plurality of hypothetical states of the mobile device from an initial location data set of the multiple location data sets, with the initial location data set providing an initial absolute location and an uncertainty relative to the initial absolute location, model the initial absolute location and uncertainty as an initial probability distribution, sample the initial probability distribution to define a plurality of particles as the plurality of hypothetical states, apply the particle filter to the defined plurality of particles to propagate the plurality of particles through the floor-plan based on location data sets subsequent to the initial location data set, determine respective weights for each of the plurality of particles, with each of the weights including a respective MFP score for a respective subsequent location data set corresponding to the respective one of the plurality of particles, determine an updated probability distribution of a state of the mobile device from the propagated and weighted plurality of particles, and determine the current location of the mobile device based on the updated probability distribution of the state of the mobile device.

Each of the plurality of obstacle indication values for the respective ones of the multiple location data sets may include data describing respective cardinal axes in a portion of the floor-plan corresponding to the respective ones of the multiple location data sets, with the cardinal axes being approximately parallel to, or perpendicular to, at least one edge of at least one obstacle in the portion of the floor-plan. The processor configured to apply the particle filter and determine the current location of the mobile device may be configured to determine an initial hypothetical state of the mobile device from an initial location data set of the multiple location data sets that provides an initial absolute location and an uncertainty relative to the initial absolute location, model the initial absolute location and uncertainty as an initial probability distribution, sample the initial probability distribution to define a plurality of particles as the plurality of hypothetical states, apply the particle filter to the defined plurality of particles to propagate the plurality of particles through the floor-plan based on location data sets subsequent to the initial location data set, with heading values indicated by the subsequent location data sets being corrected to conform to respective cardinal axes for respective portions of the floor-plan corresponding to the subsequent location data sets, determine respective weights for each of the plurality of particles, determine an updated probability distribution of a state of the mobile device from the propagated and weighted plurality of particles, and determine the current location of the mobile device based on the updated probability distribution of the state of the mobile device.

The processor configured to determine the current location of the mobile device based on the plurality of hypothetical locations and the plurality of obstacle indication values may be configured to optimize at least one cost function defined based on the plurality of hypothetical locations and the plurality of obstacle indication values.

The plurality of obstacle indication values for the plurality of hypothetical locations may include mean-free-path (MFP) scores determined based on the floor-plan, with each MFP score including a respective measure of proximity of at least some of obstacles in the floor-plan to one of the plurality of hypothetical locations. The processor configured to optimize the at least one cost function may be configured to determine at least one initial hypothetical location of the mobile device from an initial location data set of the multiple location data sets, the initial location data set providing an initial absolute location and an uncertainty relative to the initial absolute location, apply the multiple location data sets to the at least one initial hypothetical location to define at least one hypothetical path through the floor-plan, the at least one hypothetical path generated based on the plurality of hypothetical locations, and to define at least one cost function term, of the at least one cost function, for each of the at least one hypothetical path based on the MFP scores and the respective ones of the multiple location data sets corresponding to the at least one hypothetical path, optimize the at least one cost function to determine at least one cost value for the at least one hypothetical path, and determine the current location of the mobile device as an end point of a hypothetical path with a lowest cost value.

Each obstacle indication values for the multiple location data sets may include cardinal axes data representative of respective cardinal axes in a portion of the floor-plan corresponding to the respective one of the multiple location data sets, with the cardinal axes being approximately parallel to, or perpendicular to, at least one edge of at least one obstacle in the portion of the floor-plan. The processor configured to optimize the at least one cost function and determine the current location of the mobile device may be configured to determine at least one initial hypothetical location of the mobile device from an initial location data set of the multiple location data sets, the initial location data set providing an initial absolute location and an uncertainty relative to the initial absolute location, apply the multiple location data sets to the at least one initial hypothetical location to define at least one hypothetical path through the floor-plan, the at least one hypothetical path generated based on the plurality of hypothetical locations, and to define at least one cost function term, of the at least one cost function, for each of the at least one hypothetical path based on the cardinal axes data for the multiple location data sets used to define the at least one hypothetical path, optimize the at least one cost function to determine at least one cost value for the at least one hypothetical path, and determine the current location of the mobile device as an end point of a hypothetical path with a lowest cost value.

The wireless transceiver of the mobile device may be configured to receive the floor-plan from a location server.

The floor-plan may be divided into a plurality of regions, and each region may be associated with a respective one of the plurality of obstacle indication values.

In some variations, a method is provided that includes obtaining, by a mobile device, multiple location data sets from at least one location sensor of a mobile device corresponding to respective different instants, with the at least one location sensor including one or more of, for example, a global navigation satellite system (GNSS) receiver, a wireless transceiver, an infrared transceiver, an ultrasonic transceiver or a near-field communication (NFC) receiver, and/or one or more pedestrian dead reckoning (PDR) sensors. The method may also include obtaining, by the mobile device, a plurality of obstacle indication values, derived from a floor-plan of a venue, for the respective multiple location data sets, determining, by the mobile device, a plurality of hypothetical locations of the mobile device in the venue based on the multiple location data sets, and determining, by the mobile device, a current location of the mobile device based on the plurality of hypothetical locations and the plurality of obstacle indication values.

Embodiments of the method may include at least some of the features described in the present disclosure, including at least some of the features described above in relation to the mobile device, as well as one or more of the following features.

The plurality of hypothetical locations may be included in a plurality of hypothetical states of the mobile device, and determining the current location of the mobile device may include applying a particle filter to the plurality of hypothetical states to generate a probability distribution over the plurality of hypothetical states and the plurality of obstacle indication values, and determining the current location of the mobile device from the generated probability distribution.

The plurality of obstacle indication values for the plurality of hypothetical locations may include mean-free-path (MFP) scores, determined based on the floor-plan, for the plurality of hypothetical locations, with each MFP score including a respective measure of proximity of at least one obstacle in the floor-plan to a respective hypothetical location. Applying the particle filter to generate the probability distribution may include determining an initial one of the plurality of hypothetical states of the mobile device from an initial location data set of the multiple location data sets, the initial location data set providing an initial absolute location and an uncertainty relative to the initial absolute location, modeling the initial absolute location and uncertainty as an initial probability distribution, sampling the initial probability distribution to define a plurality of particles as the plurality of hypothetical states, applying the particle filter to the defined plurality of particles to propagate the plurality of particles through the floor-plan based on location data sets subsequent to the initial location data set, determining respective weights for each of the plurality of particles, with each of the weights including a respective MFP score for a respective subsequent location data set corresponding to the respective one of the plurality of particles, and determining, as the generated probability distribution, an updated probability distribution of a state of the mobile device from the propagated and weighted plurality of particles.

Each obstacle indication values for the respective ones of the plurality of hypothetical locations may be associated with cardinal axes data representative of respective cardinal axes in a portion of the floor-plan including the respective ones of the plurality of hypothetical locations, the cardinal axes being approximately parallel to, or perpendicular to, at least one edge of at least obstacle in the portion of the floor-plan. Applying the particle filter to generate the probability distribution and determining the current location of the mobile device may include determining an initial hypothetical state of the mobile device from an initial location data set of the multiple location data sets that provides an initial absolute location and an uncertainty relative to the initial absolute location, modeling the initial absolute location and uncertainty as an initial probability distribution, sampling the initial probability distribution to define a plurality of particles as the plurality of hypothetical states, applying the particle filter to the defined plurality of particles to propagate the plurality of particles through the floor-plan based on location data sets subsequent to the initial location data set, with heading values indicated by the subsequent location data sets being corrected to conform to the respective cardinal axes for respective portions of the floor-plan corresponding to the subsequent location data sets, determining respective weights for each of the plurality of particles, and determining, as the generated probability distribution, an updated probability distribution of the state of the mobile device from the propagated and weighted plurality of particles.

Determining the current location of the mobile device based on the plurality of hypothetical locations and the plurality of obstacle indication values may include optimizing at least one cost function defined based on the plurality of hypothetical locations and the plurality of obstacle indication values, and determining the current location of the mobile device based on a smallest cost value determined from the optimized at least one cost function.

The plurality of obstacle indication values for the multiple location data sets may include mean-free-path (MFP) scores determined based on the floor-plan, with each MFP score including a respective measure of proximity of at least some of obstacles in the floor-plan to one of the plurality of hypothetical locations, and optimizing the at least one cost function may include determining at least one initial hypothetical location of the mobile device from an initial location data set of the multiple location data sets, the initial location data set providing an initial absolute location and an uncertainty relative to the initial absolute location, applying the multiple location data sets to the at least one initial hypothetical location to define at least one hypothetical path through the floor-plan, the at least one hypothetical path generated based on the plurality of hypothetical locations, and to define at least one cost function term, of the at least one cost function, for each of the at least one hypothetical path based on the MFP scores and the respective ones of the multiple location data sets corresponding to the at least one hypothetical path, and optimizing the at least one cost function to determine at least one cost value for the at least one hypothetical path.

Each of the plurality of obstacle indication values for the plurality of hypothetical locations may include cardinal axes data representative of respective cardinal axes in a portion of the floor-plan including the respective ones of the plurality of hypothetical locations, with the cardinal axes being approximately parallel to, or perpendicular to, at least one edge of at least obstacle in the portion of the floor-plan. Optimizing the at least one cost function may include determining at least one initial hypothetical location of the mobile device from an initial location data set of the multiple location data sets, the initial location data set providing an initial absolute location and an uncertainty relative to the initial absolute location, applying the multiple location data sets to the at least one initial hypothetical location to define at least one hypothetical path through the floor-plan, the at least one hypothetical path generated based on the plurality of hypothetical locations, and to define at least one cost function term, of the at least one cost function, for each of the at least one hypothetical path based on the cardinal axes data for the plurality of hypothetical locations, and optimizing the at least one cost function to determine at least one cost value of the at least one hypothetical path.

Each hypothetical location may be associated with a first obstacle indication value indicating a mean-free-path length in a portion of the floor-plan including the hypothetical location, and a second obstacle indication value describing respective cardinal axes in the portion of the floor-plan, the cardinal axes being approximately parallel to, or perpendicular to, at least one edge of at least one object in the portion of the floor-plan.

In some variations, an apparatus is provided that includes means for obtaining multiple location data sets representing respective different instants from at least one location sensor of a mobile device, with the at least one location sensor including one or more of, for example, a global navigation satellite system (GNSS) receiver, a wireless transceiver, an infrared transceiver, an ultrasonic transceiver or a near-field communication (NFC) receiver, and/or one or more pedestrian dead reckoning (PDR) sensors. The apparatus also includes means for obtaining a plurality of obstacle indication values, with each of the plurality of obstacle indication values, for each of the multiple location data sets, being derived from a floor-plan of a venue, means for determining a plurality of hypothetical locations of the mobile device in the venue based on the multiple location data sets, and means for determining a current location of the mobile device based on the plurality of hypothetical locations and the plurality of obstacle indication values.

Embodiments of the apparatus may include at least some of the features described in the present disclosure, including at least some of the features described above in relation to the method and the mobile device, as well as one or more of the following features.

The means for determining the current location of the mobile device may include means for applying a particle filter to a plurality of hypothetical states, with the plurality of hypothetical states including the plurality of hypothetical locations of the mobile device, means for generating a probability distribution over the plurality of hypothetical states and the plurality of obstacle indication values, and means for determining the current location of the mobile device from the generated probability distribution.

The plurality of obstacle indication values for the multiple location data sets may include respective mean-free-path (MFP) scores, determined based on the floor-plan, for the plurality of hypothetical locations, with each MFP score including a respective measure of proximity of at least some of obstacles in the floor-plan to a respective hypothetical location. The means for applying the particle filter and the means for determining the current location of the mobile device may include means for determining an initial one of the plurality of hypothetical states of the mobile device from an initial location data set of the multiple location data sets, the initial location data set providing an initial absolute location and an uncertainty relative to the initial absolute location, means for modelling the initial absolute location and uncertainty as an initial probability distribution means for sampling the initial probability distribution to define a plurality of particles as the plurality of hypothetical states, means for applying the particle filter to the defined plurality of particles to propagate the plurality of particles through the floor-plan based on location data sets subsequent to the initial location data set, means for determining respective weights for each of the plurality of particles, each of the weights including a respective MFP score for a respective subsequent location data set corresponding to respective ones of the plurality of particles, means for determining an updated probability distribution of a state of the mobile device from the propagated and weighted plurality of particles, and means for determining the current location of the mobile device based on the updated probability distribution of the state of the mobile device.

Each of the plurality of obstacle indication values for the respective ones of the multiple location data sets may include data describing respective cardinal axes in a portion of the floor-plan corresponding to the respective ones of the multiple location data sets, with the cardinal axes being approximately parallel to, or perpendicular to, at least one edge of at least one obstacle in the portion of the floor-plan. The means for applying the particle filter and the means for determining the current location of the mobile device may include means for determining an initial hypothetical state of the mobile device from an initial location data set of the multiple location data sets that provides an initial absolute location and an uncertainty relative to the initial absolute location, means for modelling the initial absolute location and uncertainty as an initial probability distribution, means for sampling the initial probability distribution to define a plurality of particles as the plurality of hypothetical states, means for applying the particle filter to the defined plurality of particles to propagate the plurality of particles through the floor-plan based on location data sets subsequent to the initial location data set, with heading values indicated by the subsequent location data sets being corrected to conform to respective cardinal axes for respective portions of the floor-plan corresponding to the subsequent location data sets, means for determining respective weights for each of the plurality of particles, means for determining an updated probability distribution of a state of the mobile device from the propagated and weighted plurality of particles, and means for determining the current location of the mobile device based on the updated probability distribution of the state of the mobile device.

The plurality of obstacle indication values for the plurality of hypothetical locations may include mean-free-path (MFP) scores determined based on the floor-plan, with each MFP score including a respective measure of proximity of at least some of obstacles in the floor-plan to one of the plurality of hypothetical locations. The means for determining the current location of the mobile device may include means for determining at least one initial hypothetical location of the mobile device from an initial location data set of the multiple location data sets, the initial location data set providing an initial absolute location and an uncertainty relative to the initial absolute location, means for applying the multiple location data sets to the at least one initial hypothetical location to define at least one hypothetical path through the floor-plan, the at least one hypothetical path generated based on the plurality of hypothetical locations, and to define at least one cost function term, of at least one cost function, for each of the at least one hypothetical path based on the MFP scores and the respective ones of the multiple location data sets corresponding to the at least one hypothetical path, means for optimizing the at least one cost function to determine at least one cost value for the at least one hypothetical path, and means for determining the current location of the mobile device as an end point of a hypothetical path with a lowest cost value.

Each obstacle indication values for the multiple location data sets may include cardinal axes data representative of respective cardinal axes in a portion of the floor-plan corresponding to the respective one of the multiple location data sets, with the cardinal axes being approximately parallel to, or perpendicular to, at least one edge of at least one obstacle in the portion of the floor-plan. The means for determining the current location of the mobile device may include means for determining at least one initial hypothetical location of the mobile device from an initial location data set of the multiple location data sets, the initial location data set providing an initial absolute location and an uncertainty relative to the initial absolute location, means for applying the multiple location data sets to the at least one initial hypothetical location to define at least one hypothetical path through the floor-plan, the at least one hypothetical path generated based on the plurality of hypothetical locations, and to define at least one cost function term, of at least one cost function, for each of the at least one hypothetical path based on the cardinal axes data for the multiple location data sets used to define the at least one hypothetical path, means for optimizing the at least one cost function to determine at least one cost value for the at least one hypothetical path, and means for determining the current location of the mobile device as an end point of a hypothetical path with a lowest cost value.

In some variations, a non-transitory computer readable media is provided, that is programmed with instructions, executable on a processor, to obtain multiple location data sets representing respective different instants from at least one location sensor of a mobile device, with the at least one location sensor including one or more of, for example, a global navigation satellite system (GNSS) receiver, a wireless transceiver, an infrared transceiver, an ultrasonic transceiver or a near-field communication (NFC) receiver, and/or one or more pedestrian dead reckoning (PDR) sensors. The computer readable media also includes instructions to obtain a plurality of obstacle indication values, with each of the plurality of obstacle indication values, for each of the multiple location data sets, being derived from a floor-plan of a venue, determine a plurality of hypothetical locations of the mobile device in the venue based on the multiple location data sets, and determine a current location of the mobile device based on the plurality of hypothetical locations and the plurality of obstacle indication values.

Embodiments of the computer readable media may include at least some of the features described in the present disclosure, including at least some of the features described above in relation to the method, the mobile device, and the apparatus, as well as one or more of the following features.

The plurality of obstacle indication values for the multiple location data sets may include: 1) respective mean-free-path (MFP) scores, determined based on the floor-plan, for the plurality of hypothetical locations, with each MFP score including a respective measure of proximity of at least some of obstacles in the floor-plan to a respective hypothetical location, and/or 2) cardinal axes data representative of respective cardinal axes in a portion of the floor-plan corresponding to the respective one of the multiple location data sets, the cardinal axes being approximately parallel to, or perpendicular to, at least one edge of at least one obstacle in the portion of the floor-plan.

Other and further objects, features, aspects, and advantages of the present disclosure will become better understood with the following detailed description of the accompanying drawings.

BRIEF DESCRIPTION OF THE DRAWINGS

FIGS. 1A and 1B are diagrams of top-plan views of a venue, corresponding to two regions, showing an environment in which the mobile device may operate.

DETAILED DESCRIPTION

Figure 2:
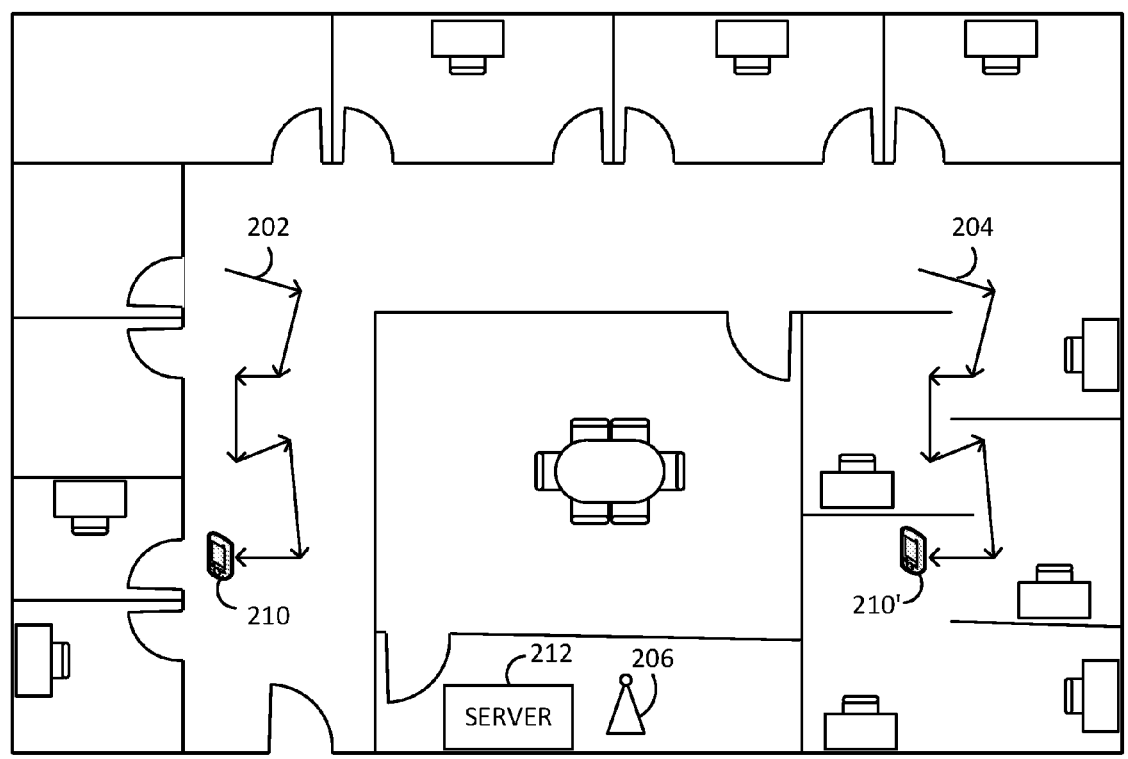
FIG. 2 is a diagram of a floor-plan of a venue.

The various embodiments disclosed herein relate to determining the location of a mobile device, and in particular to facilitating determination of the location when the device is in a confined space.

The implementations described herein employ a floor-plan stored in a computing device that may be divided into regions and each region may be associated with an indication of obstacles in or near the region. While the floor-plans described below are for the interiors of buildings, it is contemplated that the floor-plan may be of any space obstructed by obstacles, such as in an urban canyon environment. The implementations determine multiple hypothetical locations for a mobile device in the venue responsive to data provided by location sensors (e.g. pedestrian dead reckoning (PDR) sensors and/or RF sensors) associated with the mobile device. The multiple hypothetical locations may be concurrent or at different times, including at least one hypothetical location at a current time. A location metric may be determined for each hypothetical location based on a path followed by the mobile device. The location metric may be a probability or a minimized cost function value. The hypothetical locations may be processed by an algorithm that accounts for the obstacle indication values as a part of the calculation of the metrics. The location of the mobile device may be determined based on the current hypothetical location(s) and the calculated location metrics.

As used herein, obstacles are anything in the venue that may impede navigation, including, without limitation, architectural features such as walls, cubicles and movable obstacles such as furniture. Obstacles may also include designated restricted areas, even if the areas are not delimited by physical walls.

In the examples described below, the obstacle indication values may be mean-free-path (MFP) data and/or cardinal axis data, and the metrics for the hypothetical location(s) may be based on probabilities or cost functions. Generally, as described in greater detail below, MFP scores/measures are representative of the local density of obstacles to a given position. As also described below, cardinal axes provide a set of orthogonal axes that indicate the prevailing directions of local obstacles, and may be used in conjunction with an indication of how closely in agreement with these axes the edges of local obstacles are. The MFP and/or cardinal axes metrics are refined in response to sensed movement through the venue. The obstacle indication data may be determined from the floor-plan either by preprocessing the floor-plan or by calculating the obstacle indication for a hypothetical location or a hypothetical path as a part of the calculation of the metric.

One way to improve the accuracy of a location of a mobile device in an indoor environment determined by a computing device is to employ a filter, such as a particle filter, to filter out hypothetical states (including, for example, location, velocity, acceleration and heading) of the mobile device that are unlikely or impossible. In a particle filter, each "particle," represents a possible state of the mobile device at a particular time, as derived from a probability distribution describing the state. The particle may move from an initial position to a subsequent position over a period of time in many directions. Each possible transition may be modeled according to a probabilistic model conditioned on the initial position. For example, the likelihood of a particle having a particular subsequent location, velocity, acceleration and heading may be conditioned on the initial location, velocity, acceleration and heading for that particular particle and may be further influenced by received sensor data indicating changes in location, velocity, acceleration and heading. In this example, the location, velocity, acceleration and heading collectively form the state of the mobile device. In an indoor environment, particles that move in directions which intersect with obstacles, such as walls, in the venue may be extinguished (e.g., have their probabilities set to zero) as the paths pursued by these particles are unlikely.

In the examples described below, a computing device, such as a mobile device or a location server, may determine a current location of the mobile device. In an embodiment, a mobile device may determine a current location of the mobile device using assistance data, e.g. floor plan data, indications of obstacles or indications of mean free path or combinations thereof from a location server. In an embodiment, indications of obstacles, indications of floor plan data or changes in floor plan data, or indications of obstacles or changes to the indications of obstacles, or combinations thereof may be uploaded to the location server to update the corresponding assistance data information on the location server. In an embodiment, the location server may comprise an assistance server, a location determination server, or a map information server or combinations thereof. An initial absolute location determination may be made responsive to global navigation satellite signals (GNSS), local RF sources such as WiFi access points and/or cellular base stations, or from sensed proximity to known locations, for example, using a near-field communication (NFC) receiver, infrared receiver or ultrasonic receiver to sense a transponder at a particular location in a venue, for example, at the entrance of a building. A weighted centroid method may be used when the mobile device or location server uses RF signal sources to determine the location of the mobile device.

Each absolute location determination by the computing device provides a state of the mobile device with a range of uncertainty that may be modeled as a multivariate Gaussian distribution. The Gaussian distribution is then sampled by assigning particles to selected states covered by the Gaussian distribution. Following the absolute location measurement, micro-electromechanical (MEMS) PDR sensors internal to the mobile device may provide updates to the device state. In response to receiving a state update, the sampled states of the Gaussian distribution are updated by the computing device to follow the changes in location, velocity, acceleration and heading data indicated by the PDR sensor data. As particles within the Gaussian distribution encounter obstacles or indicate other impossible state values, those particles are extinguished and the remaining particles are used by the computing device to propagate the state of the mobile device. Through several movement steps, the number of remaining particles may be insufficient to represent the changing state of the mobile device. In these instances, and/or when the system receives new absolute location signals from RF, NFC, optical or RF sources, the Gaussian distribution describing the state of the mobile device may be recalculated and resampled by the computing device.

In an embodiment, particle filtering may implement a Monte Carlo method for inferring a state model that follows changes in the system state. Generally, particle filters implement two operations/steps that are repeated for each received measurement set. The first operation/step estimates the states of the samples at time T based on a probability distribution that is known at time T−1. In the second operation/step, the estimate is updated based on the measurement set received at time T. These two steps may be repeated as each new measurement set is received. The samples of the distribution may be weighted to compensate for discrepancies between the estimated distribution and the updated distribution. As described herein, the distribution may be resampled either at predetermined intervals or in response to the extinction of samples. At any time, the updated distribution represents the probabilistic state of the mobile device and can be used to determine a most likely location of the device.

In an embodiment, the particle filter may be implemented as a software program running on a user's mobile device. In an alternative embodiment, the particle filter may be implemented as a software program running on a location server. If the particle filter is implemented outside of the mobile device, updates from the PDR sensors of the mobile device and the updated state of the mobile device from the location server may be transmitted between the mobile device and the location server using wireless access points in the venue or other types of communication links (e.g., a cellular data network, Bluetooth® data link, etc.).

The methods described above may be implemented in computing device (e.g., a mobile device or a location server or combination thereof) to determine the location of a mobile device when no obstacles are present. The addition of a floor-plan—and its inherent obstacles—to the navigation problem introduces a distorting effect that is not present in navigation without one. This distortion is caused by assigning an equal probability to each direction in which the particle may travel. Consider the top-plan view shown in FIGS. 1A and 1B, where the lines 100, 102, 104, 106 indicate walls and the dots $p_1$, $p_2$, $p'_1$, $p'_2$ indicate user positions.

The arrow indicates the estimated change in position, say using pedestrian dead reckoning (PDR), from one navigation epoch to the next. The two halves of the figure show two hypotheses of nearby places where the user might be. If the user is at $p_1$ in FIG. 1A, their immediate travel may be in any direction with equal probability, subject to constraints imposed by the floor-plan. However, for a user at $p'_1$ in FIG. 1B, the direction of travel is severely restricted to being due east or due west (right or left) by the walls 104, 106. The fact that the user moved to the east should increase the relative probability that the user is at $p'_2$ rather than at $p_2$.

Let $z_{p,n}$ be the state that the user is at point p at time n, then this is saying: $P(z_{p'_2}|z_{p'_1}) > P(z_{p_2}|z_{p_1})$.

Intuitively, given the floor-plan of the venue shown in FIG. 2, it is generally clear which of the two paths, 202 or 204, the user actually took. Any procedure, technique, or algorithm that only discriminates in its probability estimate based on collisions between path and obstacle, however, might give equal probability to the both paths. Moreover, if a little noise is added to the PDR track to simulate sensor noise, only the genuine solution, 204, is likely to be eliminated in favor of the path 202 with fewer obstructions.

In Bayesian terminology, there is not a uniform prior distribution, owing to constraints imposed by obstacles. Said in other words, the fact that a user did not move in a particular direction increases the probability that the user may not have been able to move in that direction.

To see how this appears in a Bayesian filter, a category that includes most indoor navigation filters, consider the probability of a set of states $X_{0:t}$, given the set of past measurements, $Z_{1:t}$. Using Bayes theorem this probability is given by equation (1), $$P(X_{0:t}|Z_{1:t}) = \frac{P(Z_t|X_{0:t}, Z_{1:t-1})P(X_{0:t}|Z_{1:t-1})}{P(Z_t|Z_{1:t-1})} = \frac{P(Z_t|X_{0:t}, Z_{1:t-1})P(X_t|X_{0:t-1}, Z_{1:t-1})P(X_{0:t-1}|Z_{1:t-1})}{P(Z_t|Z_{1:t-1})}. \quad (1)$$

The term $P(X_t|X_{0:t-1}, Z_{1:t-1})$ incorporates any physical constraints imposed on the user's movement by a floor-plan. Typically, it is this term that prevents an estimate of the user path from passing through a wall or into any excluded area. Also, this term may be used to restrict the speed at which the user would have moved to follow the estimated path. However, it is also the term that changes if the user is restricted in the direction of movement from $X_{t-1}$ to $X_t$.

The result of ignoring this distorting effect is that too great a weight may be given to those areas where there are fewer walls or obstacles, e.g., outside the building or in a large open region. For example, a particle filter may begin with an even spread of particles over a fairly wide area, and without high accuracy absolute location data, particles outside the building are likely to survive, whereas particles may be extinguished closer to the true user position, leading to hypothetical locations in areas of the venue having few obstacles being given a greater total probability than locations in areas with many obstacles. For methods that fit the estimated relative user track to the map, likely solutions may be found in areas with few obstacles, when only a small amount of error in the estimated relative track may make the true, indoor track a more expensive solution. The methods and apparatus described below redress this balance.

The methods, systems, devices, apparatus, and other implementations described herein are discussed in terms of a particle filter approach and a cost function approach. The example shown in FIG. 2 employs a floor-plan to identify hypothetical locations. The floor-plan includes corridors and rooms as well as a WiFi access point, 206 and a server 212. In this example, a mobile device 210 (described in more detail below with reference to FIG. 5) carried by the user includes PDR sensors as well as a WiFi or Bluetooth® (WiFi/BT) transceiver. The PDR sensors and the WiFi/BT transceiver are collectively referred to as location sensors because values from both of these elements may be used to determine the location of the mobile device or at least its change in state from one epoch to the next. The example location server 212 (described below in more detail with reference to FIG. 6), may receive location signals and/or indications of location, such as sensor (accelerometer, gyro, altimeter/pressure sensor, etc.) and/or pedestrian dead reckoning (PDR) data, from the mobile device 210, or the mobile device may directly utilize the location signals and/or indications of location directly to apply a particle filter or a cost function minimization to determine two hypothetical paths 202 and 204 that are roughly equidistant from the WiFi access point 206. Sensed WiFi signals may be processed by the mobile device or the location server, for example, using trilateration, triangulation or weighted centroid methods (or other location determination techniques) to convert the signals into a location. Alternatively, signal values from the sensed WiFi signal may be applied directly to either the particle filter or the cost function. Each of these paths represents a sequence of motions that may have been made by the mobile device 210 resulting in two hypothetical locations 210 and 210'.

Typically only a single estimated state (and, thus, a single location) is hypothesized for a particle filter. The hypothetical state may be derived as follows. The normal operation of a particle filter used for positioning with a map involves propagating each particle according to a user motion model or location data sets from, for example, a pedestrian dead reckoning (PDR) system. The model extinguishes particles that collide with obstacles on the floor-plan. The model reweights particles according to independent positioning measurements, typically position estimates derived from WiFi or GNSS and extinguishes particles that have weight below a certain threshold. The model selects a hypothetical user position estimate based on the new weights of remaining particles. The methods and apparatus described below that may be implemented on a mobile device and/or a location server use a particle filter, and modify the model at the particle reweighting stage or modify the PDR data based on obstacle indication values (e.g. mean-free-path (MFP) or cardinal axes).

Instead of using a particle filter, a mobile device and/or a location server may use a cost function to determine the location of the mobile device. Typically, a single hypothetical location may be determined according to a particular cost function. In this model, location may be determined by calculating the minimum value for the cost function. In applications including obstacles, there may be many local minima, each in a distinct part of the venue. In this instance, it may be desirable to define multiple hypothetical starting locations and minimize a cost function for each hypothetical location as modified by the received location sensor data. For example, FIG. 2 shows two hypothetical paths that correspond to respective initial absolute locations determined from the WiFi access point 206. Each of these initial locations is modified by multiple displacements detected by the PDR sensors. Thus, the mobile device may be at the end of path 202 (indicated by mobile device 210) or at the end of path 204 (indicated by mobile device 210'). As described below, the obstacle indication values derived from the floor-plan may be used in the cost function that is optimized for both hypothetical paths to determine which path has a lower cost. The end of this path defines a most likely location of the mobile device.

Figure 3:
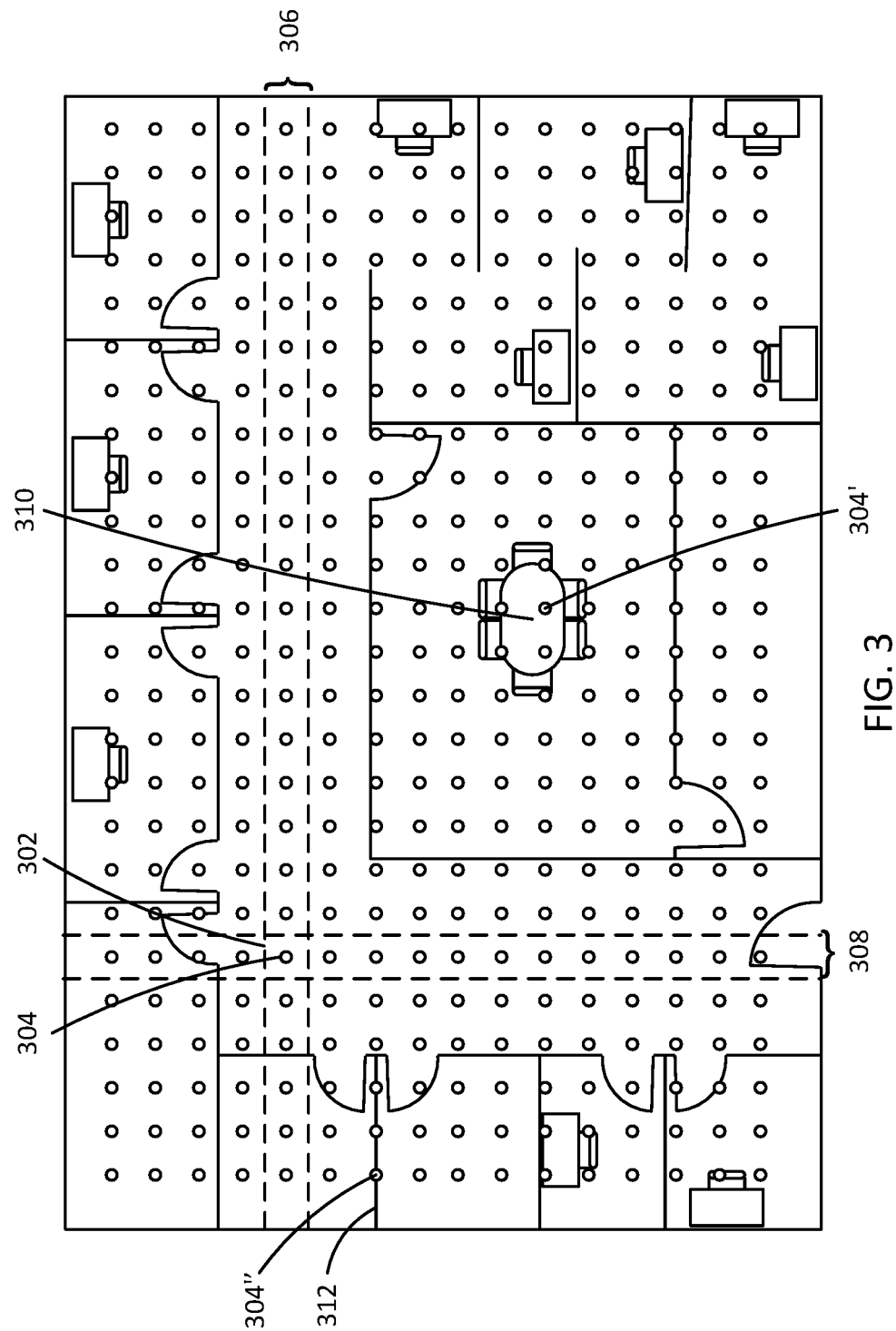
FIG. 3 is a diagram of an example of a floor-plan that may be used to calculate mean-free-path data.

FIG. 3 is a top-plan view of the venue shown in FIG. 2 divided into regions 302. Although only a single region is shown, each of the circles 304 indicates mean-free-path (MFP) scores of respective regions. In this example, the floor-plan is divided according to a plurality of vertical divisions 306 and horizontal divisions 308. For simplicity, only one vertical division 306 and one horizontal division 308 are shown in FIG. 3.

Although the regions are shown as having the same size, it is contemplated that the floor-plan may be divided into regions having different sizes, for example by using a quad-tree process/technique to divide the floor-plan into regions. This may be advantageous, for example, in venues having one or more large open regions. This method defines both larger region and smaller regions such that each region has no more than a predetermined number of obstacle edges. It is also contemplated that the floor-plan may not be divided into regions.

As described above, obstacle indicators, based on obstacle edges in or near to a region, may be pre-defined for all regions in the floor-plan to create an augmented floor-plan. Alternatively, obstacle indicators may be calculated for each region or for each hypothetical location if the floor-plan has not been divided, as the region or location is encountered by the mobile device. The examples below describe two types of obstacle indicators, MFP scores and cardinal axes.

The first embodiments, described below, consider the use of MFP scores. It is contemplated that some regions, for example, the region including the conference table 310 having score 304', or the region that includes wall 312 having score 304" may not have MFP scores or may have zero-valued scores. Further, the scores of regions that include obstacles may be modified based on the type of obstacle. For example, the score 304' may be higher than score 304" because, if the table is moved, the mobile device may be in or transit through the region having score 310 while it is less likely that it could transit through the wall in region 312.

The score 304 for a region 302 may be based on proximity to obstacles. Each region in this example has an area of a few square meters, although smaller or larger regions may be used depending on the overall accuracy of the system and the computational and storage requirements. One way to calculate the score is as a function of the lengths of unobstructed paths. One example calculates the lengths of paths radiating evenly from a chosen point (e.g., the center of the region) up to some maximum distance. An average of these distances (e.g., mean or median) may be assigned to that point, or its surrounding area, as the MFP score 304. Thus, as used herein, the term "mean-free-path" or MFP also includes the median-free-path. When the floor-plan is not divided into regions, the MFP value for a particular location may be determined according to the same algorithm.

It is contemplated that the MFP score for a region or a hypothetical location may be a simple average of the lengths of the angular free-paths or it may an average normalized to be between zero and one once all of the scores have been calculated. A higher score indicates a region with few or no nearby obstacles, while a lower score indicates a region with significant nearby obstacles. As applied to the particle filter, this score may be used, directly or through a conversion formula, to weight the probability of a particle being in a particular location or having taken a particular route to arrive at the location.

Any one of a number of processes or schemes can be used to apply the scores in order to adjust the weight of different particles. For example, consider a particle, p, that has been propagated in two-dimensional space by moving it a distance d from (x0,y0) to (x1,y1). If the mean-free-path score at (x0,y0) is s, then the weight w of p is altered, for example, using the following scheme: $w \times e^{-ds}$. This results in increasing the weight (and, thus, the probability) in areas having more nearby obstacles and decreasing the weight in areas having fewer nearby obstacles.

The above example uses a particle filter, but any positioning method that uses a notion of probability or weight for a position hypothesis can clearly be modified by an obstacle-proximity score in a similar way. The overall modified weight or probability of the hypothetical state is likely to be used to modify the confidence in the final position estimate as well as modifying the estimate itself.

As an alternative to calculating a MFP score, the floor-plan may or may not be divided into regions and all regions or selected regions or locations may be analyzed to determine the orientation of cardinal axes in each region. This data may be pre-calculated, either for the entire floor-plan (e.g., when the floor-plan includes orthogonal walls in a common coordinate system) or for each region of a divided floor-plan. Alternatively, the cardinal axes may be calculated for the entire venue, for each hypothetical location, or for each region as it is encountered during the location processing.

The methods implemented on a mobile device and/or a location server for determining the cardinal axes may assume that the direction of motion near walls and obstacles is more likely to be parallel to, or perpendicular to, the obstacle edge than at other angles. For example, in a corridor, the user motion is very likely to be parallel to the corridor walls; on entering a building, the motion is likely to be perpendicular to the outside edge of the building. These methods may initially assign, to every region of floor-plan, a direction and a magnitude indicating the prevailing perpendicular axes of obstacle edges nearby and the dominance of that direction, respectively. Alternatively, the calculation to determine the cardinal axes may be performed for each region or hypothetical location as it is encountered by the mobile device moving through the venue. The magnitude may be high if there are many nearby obstacles having aligned edges with the same cardinal axes, and low where the nearest obstacle is relatively far away or where there are no clearly prevailing axes among the objects in the region. The vector describing the local cardinal axes is then used to "correct" the estimated direction of user motion, by modifying it to be closer to one of the two, perpendicular, cardinal axes.

Figure 4:
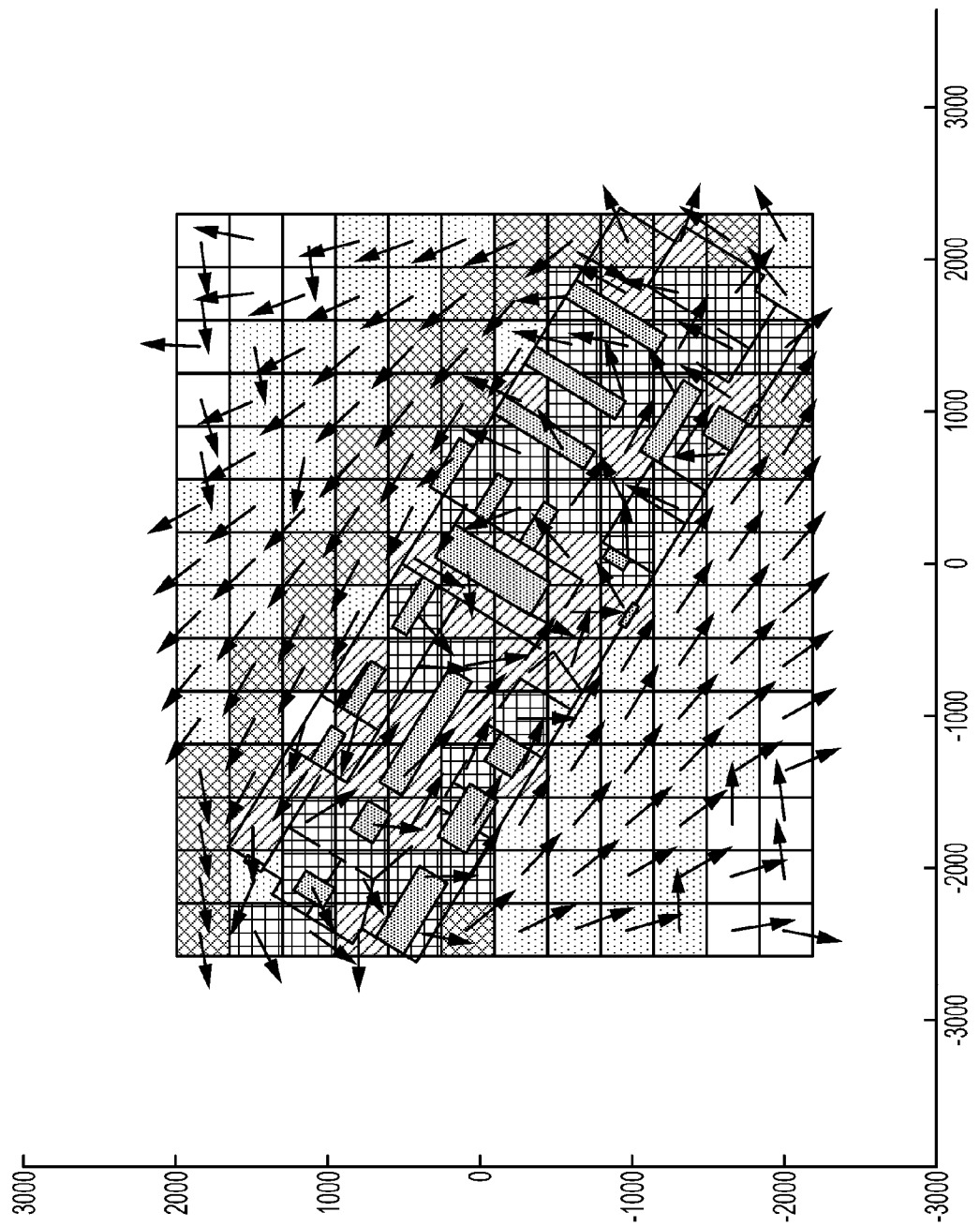
FIG. 4 is a diagram of an example of a floor-plan showing cardinal axes data.

FIG. 4 is a diagram showing square regions covering a floor-plan, where walls and obstacles are in black. The direction of the cardinal axis and its magnitude are shown by arrows and by the intensity of the shading in the regions (e.g. a background heat map), respectively.

Given an estimated user position and heading, the cardinal axes can be used to conform the PDR data to the cardinal axes, for example, by averaging the PDR heading data with the nearest cardinal axis, or by snapping the PDR heading data to that axis (effectively averaged with infinite weight on the cardinal axis component). The conforming process/algorithm may, in some embodiments, employ a threshold angle (e.g., $\pi/12$ to $\pi/6$ radians) for the closeness of the PDR data to the cardinal axis, applying a correction only if the difference between the two is less than the threshold.

The cardinal axes may be calculated by a mobile device and/or a location server in any of a number of different ways. In one example method, for a given region, R, let the set of obstacle edges that intersect the region be S. For a directed line segment, $l \in S$, let $$l_i = r_i \begin{bmatrix} \cos\theta_i \\ \sin\theta_i \end{bmatrix}$$

describe the vector $l_i$. Let $$l'_i = r_i \begin{bmatrix} \cos 4\theta_i \\ \sin 4\theta_i \end{bmatrix}$$

be the vector produced by multiplying the angle by four. Now, to average the modified vectors, compute $$L = \begin{bmatrix} L_x \\ L_y \end{bmatrix} = \sum_{l_i \in R} l'_i.$$

The cardinal axes may be given by equation (2) as follows:

$$CA = a \tan 2(L_y, L_x)/4 \qquad (2)$$

The magnitude of a cardinal axis is given by $|L|$, and thus, the cardinal axis has a greater magnitude if multiple edges in the region have the same orientation. Alternatively or in addition, the magnitudes of corresponding cardinal axes in adjacent regions or within a range about a hypothetical location may be compared and, if multiple adjacent regions have the same cardinal axis direction, the magnitudes of the corresponding cardinal axes in the region and the two or eight adjacent regions or in a similar range may be summed to produce a new magnitude value for the region.

According to another method implemented on a mobile device and/or a location server, the vectors of S may be translated so that they all lie in the first quadrant, i.e., $0 \leq \theta_i < \pi/2$; the translation is a modulo $\pi/2$ operation. Instead of averaging these vectors, this method finds the angle $\theta_1$ that maximizes $f(\theta)$, the total length of vectors that lie in the range $[\theta-\delta, \theta+\delta]$ (mod $(\pi/2)$), where $\delta$ is in a range from $\pi/12$ to $\pi/6$ radians for example. Let $\theta_2$ be the largest value of $f(\theta)$ that lies outside $[\theta_1-\delta, \theta_1+\delta]$ (mod $(\pi/2)$). Now, the magnitude of the cardinal axis, $\theta_1$, may be taken as some factor of the ratio $\theta_1/\theta_2$.

As described herein, if the type of obstacle represented on the map is known, e.g., moveable furniture, walls, pillars, etc., then one or more types could be ignored or downweighted by a mobile device and/or a location server. This cardinal axis data may be applied to a particle filter by adjusting the PDR signals that are used to determine the trajectory of the particles before using the PDR signals to translate the probability distribution, as represented by the particles, in the venue.

Although the described examples are in terms of the probabilities of multiple hypothetical states, the MFP values may also be used with a technique that minimizes a cost function for one or more hypothetical paths.

The cost function may be evaluated by a mobile device and/or a location server by summing a number of terms. Each position fix and/or each RF observation contributes a term. The cost function equation may then be differentiated and adjusted in response to the differentiated equation to seek a minimum value. Each term represents a constraint on any putative solution from the whole solution space (roughly the set of all PDR shaped paths and transmitter positions). The value of the cost function for each term is represented by the letter E (for energy). The derivative of the cost function with respect to the x and y coordinate axes is used to optimize the cost function using techniques such as Conjugate gradients and simplex methods. Other methods, such as simulated annealing and genetic algorithms may also be used to optimize the cost function. The type of solver may be chosen depending on the presentation of the cost function. The example cost function presented below is doubly differentiable and conjugate gradient methods are efficient for this type of function.

Each position fix contributes a term, $E_{PFi}$ given by equation (3).

$$E_{PFi}=(X_i-X_{PFi})^T(X_i-X_{PFi})/\sigma_{PFi}^2 \quad (3)$$

In this equation, $x_i$ is given by equation (4).

$$X_i=X_1+D\Sigma_{k=1}^{i=1}\Delta_{PDRk} \quad (4)$$

Here, $x_i$ is the position of the node of a putative path at the ith epoch, the time associated with the position fix, $X_{PFi}$ is the location of the position fix and $\sigma_{PFi}^2$ is the variance (actually, a 2×2 covariance matrix) associated with the position fix. $x_i$ is expressed in terms of the variables of the minimization problem in equation (4) as the position at the first epoch ($x_1$) plus the displacement due to the (rotated and stretched) PDR path ($D\Sigma_{k=1}^{i=1}\Delta_{PDRk}$) from the first epoch to the epoch of the position fix. The rotation and stretch of the PDR path are encapsulated in the matrix D, as shown in equation (5).

$$D = \lambda_{SL}\begin{pmatrix} \cos\theta_H & -\sin\theta_H \\ \sin\theta_H & \cos\theta_H \end{pmatrix} \quad (5)$$

where $\lambda_{SL}$ is the step length stretch factor and $\theta_H$ is the rotation angle.

Each RF measurement also contributes a term, $E_{RFi}$, given by equation (6).

$$E_{RFi}=(X_k-X_{TXj})^T(X_k-X_{TXj})/\sigma_{RFi}^2 \quad (6)$$

In equation (6), the subscript k indicates the epoch (RF scan) on which the observation was made. Thus, there are typically many of these terms (one for each RF measurement in a scan) for a single k. $A_{TxJ}$ is the estimated position of the transmitter seen in the $i^{th}$ RF measurement (so the subscript j depends on i). The term $\sigma_{RFi}^2$ represents the positional uncertainty associated with the observation and may be obtained from a look-up-table based on the strength of the signal from the particular RF source. The term $X_k$ is expressed in terms of the distorted PDR path as described above for position fixes. If RF position fixes are to be used for Wi-Fi or Bluetooth® Low Energy (BLE), these are taken to replace Wi-Fi or BLE RF measurement constraints, which no longer contribute.

Each transmitter (denoted by k) observed in the problem contributes a term $E_{Txk}$ given by equation (7).

$$E_{Txk}=(A_{Txk}-A_{Txk}^0)^T(A_{Txk}-A_{Txk}^0)/\sigma_{Txk}^2 \quad (7)$$

In equation (7), the term $A_{Txk}^0$ is the position of the kth transmitter and $\sigma_{Txk}^2$ is the variance of that position.

The terms associated with the PDR distortion variables are $E_{SL}$ and $E_H$, given by equations (8) and (9), respectively.

$$E_{SL}=(\lambda_{SL}-1)^2/\sigma_{SL}^2 \quad (8)$$

$$E_H=(\theta_H)^2/\sigma_H^2 \quad (9)$$

The values $\sigma_{SL}^2$ and $\sigma_H^2$ are configurable and represent a willingness to allow distortion.

The total cost, E, without map contribution, is given by equation (10).

$$E=E_{PF}+E_{RF}+E_{Tx}+E_H+E_{SL} \quad (10)$$

The basic map contribution is a sum of the values of $obs_k$ overall path segments. $obs_k$ is zero (0) for segments of the path that do not cross obstacles and larger than zero for segments that cross obstacles, the value depending on the type of obstacle (e.g. a wall crossing would have higher cost than crossing moveable furniture). The values are summed over all k−1 segments. As described herein, the map contribution may include MFP values and/or cardinal axes values.

The effect of introducing the mean-free-path scheme is to reward the segments of the path that do not cross obstacles but are in an obstacle-dense area. This could take the form of a "discount" in cost according to the local mean-free-path value. The cost contribution is given by equation (11).

$$E_{map} = \sum_{k=1}^{nUserPosition-1} (obs_k - mfp_k) \quad (11)$$

This cost contribution consists of an obstacle value $obs_k$ and the mean-free-path value $mfp_k$ for each segment. $mfp_k$ is the local mean-free-path value and its value may be calculated from the local mean-free-path values in the map in any one of a number of convenient ways: the mean-free-path score for the region containing the starting point of the segment; the region containing the end point of the segment; or an average of the scores of multiple regions traversed by the segment. This discount may then be used to alter the cost of the mobile device traversing a particular hypothetical path.

Thus, when MFP data is used as the obstacle indication, the cost function E may be defined by equation (12) as follows:

$$E=E_{PF}E_{RF}+E_{Tx}+E_H+E_{SL}+E_{map} \quad (12)$$

Cardinal axes may also be used with a location determination procedure/method that minimizes a cost function. The object of this approach is to find the best fit of a set of recent measurements (PDR, WiFi, GNSS, etc.) to a floor-plan. Finding the best fit means minimizing a cost function, where the cost is made up of contributions from each of the different measurement systems and from the floor-plan (including information on the cardinal axes).

The basic PDR contribution to cost is described by equation (6) above. The addition of the cardinal axes method to this formulation would mean that the heading of each segment of this PDR path is penalized by an amount based on by how much the heading of the path differs from one of the cardinal axes. If $m_{CA}$ and $h_{CA}$ are the magnitude and heading of a cardinal axis, respectively, and $h_k$ is the heading of the kth component of the path, then let $\theta_k$ be the minimum angle between $h_k$ and either axis defined by $h_{CA}$. The cardinal axes method may be used to change the PDR contribution as indicated in equation (13).

$$E_{PDR} = \sum_{k=1}^{nUserPositions-1} (1 + m_{CA}\theta_k^2) \cdot E_{PF} \qquad (13)$$

Thus, the cost function when data on the cardinal axes is used may be expressed by equation (14).

$$E = E_{PDR} + E_{RF} + E_{Tx} + E_H + E_{SL} \qquad (14)$$

The MFP and cardinal axes data may be combined in a cost function similar to equation (15), below (it is contemplated that the relative weights of the EPDR and EMAP may need to be adjusted).

$$E = E_{PR} + E_{RF} + E_{Tx} + E_H + E_{SL} + E_{map} \qquad (15)$$

If more than one hypothetical path is defined for the floor-plan, the implemented process would minimize the cost function for all hypothetical paths and select the path having the lowest cost function value as the most likely path for the mobile device. The end location of the selected path would be deemed to be the current location of the mobile device.

Figure 5:
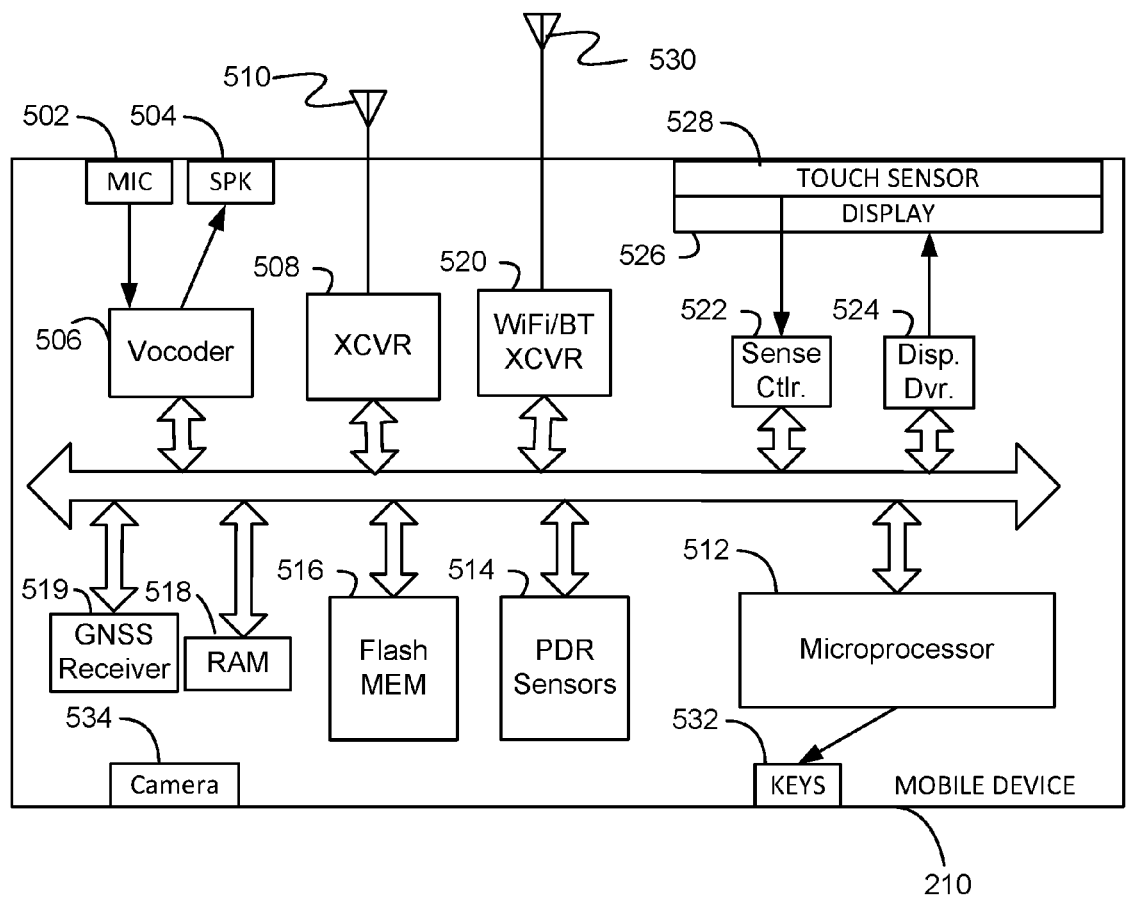
FIG. 5 is a block diagram of a mobile device.

FIG. 5 is a block diagram of an example mobile device 210 that may be used to implement the example embodiments described herein. A microprocessor (also referred to as a controller) 512 serves as a programmable controller for the mobile device 210, in that it controls operations of the mobile device, e.g., in accordance with programming that it executes, for all operations. In some examples, the mobile device random access memory (RAM) 518 and/or flash memory 516 store software such as an operating system, application programs that control the operation of the microprocessor 512 as well as mobile configuration settings, such as mobile directory number (MDN) and/or mobile identification number (MIN), etc. and other data used by the microprocessor 512. In some examples, floor plan data may also be stored in the RAM 518 and/or flash memory 516.

The example mobile device 210 further includes a microphone 502, speaker 504 and vocoder 506 for audio input and output functions. In an embodiment, the mobile device may contain a GNSS receiver 519 to receive GNSS signals that may be processed in a processor such as a GNSS baseband, a DSP, a processor (such as microprocessor 512) or other processor. The mobile device 210 also includes at least one digital transceiver (XCVR) 508, for digital wireless (e.g. cellular) communications to communicate with cellular telephony networks such as, for example, TDMA, GSM, CDMA, WCDMA, LTE, etc., and to also communicate with other type of wireless networking technologies such as, for example, WiMax (802.16), etc. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other radio access technology (RAT). GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. In some embodiments, 4G networks, Long Term Evolution ("LTE") networks, Advanced LTE networks, Ultra Mobile Broadband (UMB) networks, and all other types of cellular communications networks may also be implemented and used with the systems, devices methods, and other implementations described herein. A WLAN may also be implemented, at least in part, using an IEEE 802.11x network, and a WPAN may be a Bluetooth® wireless technology network, an IEEE 802.15x, or some other type of network.

The mobile device 210 may also include at least one short-range transceiver 520, shown in the example as a WiFi/BT transceiver, to communicate with the server 212 via the WiFi access point 206 (shown in FIG. 2). Although the transceiver 520 is shown as being a WiFi and/or Bluetooth® transceiver, it is contemplated that other short range RF technologies may be used such as near-field communications (NFC), ultra-wideband (UWB), Zigbee®, optical (e.g. infrared) or ultrasonic. The transceiver 508 provides two-way wireless communication of information, such as vocoded speech samples and/or digital information, in accordance with the technology of the telecommunications network. Each example transceiver 508 and 520 connects through RF send and receive amplifiers (not separately shown) to a respective antenna 510 and 530, although it is contemplated that both transceivers could use a single antenna. The transceiver 508 may also support various types of mobile messaging services, such as short message service (SMS), enhanced messaging service (EMS) and/or multimedia messaging service (MMS) and may include a web browser for interacting with websites either through the telecommunications transceiver 508 or the short-range transceiver 520.

The user interface of the exemplary mobile device 210 includes a display 526, which the microprocessor 512 controls via a display driver 524, to present visible outputs to the device user. The user interface may also include keys 532 and a touch/position sensor 526 that overlies the display 526 and is relatively transparent, so that the user may view the information presented on the display 526. A sense controller 522 senses signals from elements of the touch/position sensor 528 and detects the occurrence and position of each touch of the screen formed by the display 526 and sensor 528. The sense controller 522 provides touch position information to the microprocessor 512, which can correlate that information to the information currently displayed via the display 526, to determine the nature of user input via the sensor 528.

The mobile device 210 also includes PDR sensors 514. Example PDR sensors include MEMS devices such as an accelerometer, a gyroscope (including an optical gyroscope), a magnetometer, a pedometer and a barometer. Output data from these sensors is applied to the microprocessor 512 to determine changes in the state of the mobile device 210. As described above, the detected changes in state are indicated by location data sets that may include, for example, data values from one or more of the PDR sensors and/or signal strength values and source identifiers (e.g. MAC addresses) of the WiFi access point 206 or of cellular towers (not shown). Alternatively, the location data sets may include hypothetical locations (both past and present) or path segments calculated by the mobile device from the PDR sensors and WiFi, Bluetooth®, optical, ultrasonic, NFC and/or cellular signals. The location data sets are processed using the floor-plan and obstacle indication data derived from the floor-plan to determine the location of the mobile device 210. The mobile device 210 may further include such sensors as a thermometer (e.g., a thermistor; not shown), an audio sensor (which may be the same or different from the microphone 502), and/or other sensors. The mobile device 210 may additionally include a camera 534 (e.g., a charge-couple device (CCD)-type camera, a CMOS-based image sensor, etc.), which may produce still or moving images (e.g., a video sequence) that may be displayed on a user interface device, such as a display or a screen, and that may be further used to determine an ambient level of illumination and/or information related to colors and existence and levels of UV and/or infra-red illumination.

The location procedures, techniques, or algorithms described herein may be implemented using the microprocessor 512 of the mobile device 210, in a location server 212, or partially in the mobile device 210 and partially in the location server 212. Due to the number of computations performed to implement, for example, a particle filter, it may be advantageous to implement the location determination procedure(s) in a location server, such as the server 212 (which may be, for example, an E-SMLC server, or some other type of server). This would place less computational burden on the mobile device, increasing its battery life while allowing the user to more easily perform other tasks while the location of the mobile device 210 is being monitored.

Figure 6:
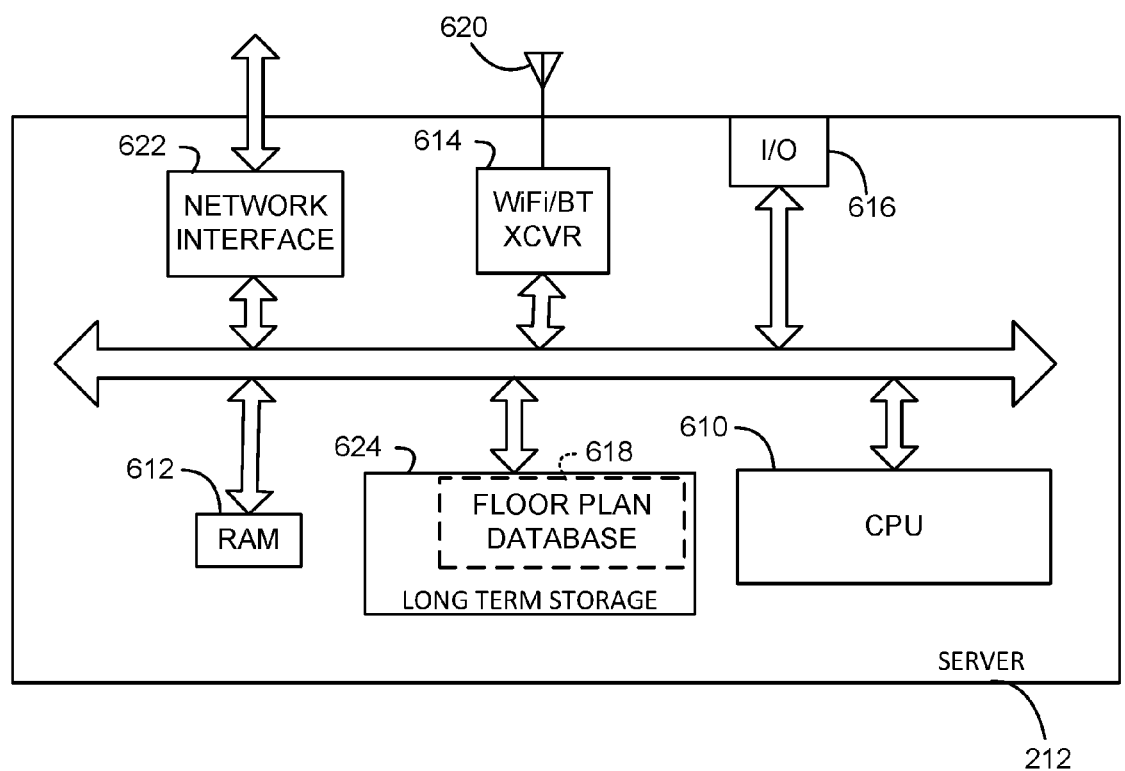
FIG. 6 is a block diagram of a server.

FIG. 6 is a block diagram of an example server 212. This server includes a central processing unit (also referred to as a controller) 610 and memory (e.g., RAM 612). The RAM holds systems programs for the server 212 as well as programs that implement the location determination procedures/techniques/algorithms described herein. It also provides working memory and temporary data storage for the CPU. In addition to the RAM 612, the server includes long-term storage 624 which may be an optical or magnetic disk or a solid-state disk (e.g., a flash memory device). The server 212 also includes an input/output (I/O) interface 616 that may be used to connect the server to I/O devices such as a keyboard (not shown) and a monitor (not shown).

The server 212 may communicate with the access point 206 via a wired network interface 622 to implement a wireless local area network (WLAN) in the venues shown in FIGS. 2, 3 and 4. The example server 212 also includes a short-range transceiver such as a WiFi/BT transceiver 614 that is coupled to an antenna 620. The transceiver 614 and antenna 620 are used to communicate with other devices such as the mobile device 210, e.g., to receive or transmit data indicating the strength, round-trip time or angle of arrival of the WiFi and/or Bluetooth® signals, from the transceiver 520 of the mobile device (shown in FIG. 5) and/or from the access point 206, as well as to communicate changes in state or the output signals of the PDR sensors 514. In some implementations, the long term storage 624 also includes a floor-plan database 618, which holds one or more of the floor-plans (as described herein), possibly augmented with MFP and/or cardinal axis obstacle indication values. Although FIG. 6 shows the floor-plan database as stored in the long term (non-volatile) storage 624, it is contemplated that it may be stored in the RAM 612 or in another memory device (not shown) that may be accessed by the CPU 610.

In some embodiments, a system that includes the location server 212 may be configured to both generate the augmented floor-plan and compute the location of the mobile device 210. In some implementations, the mobile device 212 may derive its location using a floor-plan obtained (e.g., received/downloaded) from the location server. In such implementations, at least a portion of the floor-plan (e.g. at least a portion including all possible regions that may be encountered by the mobile device 210 and, optionally, corresponding obstacle indication values) may be transferred to the mobile device, for example, via the WLAN, and stored, for example, in the flash memory 516 or in the RAM 518 as the floor-plan database.

Figure 7A:
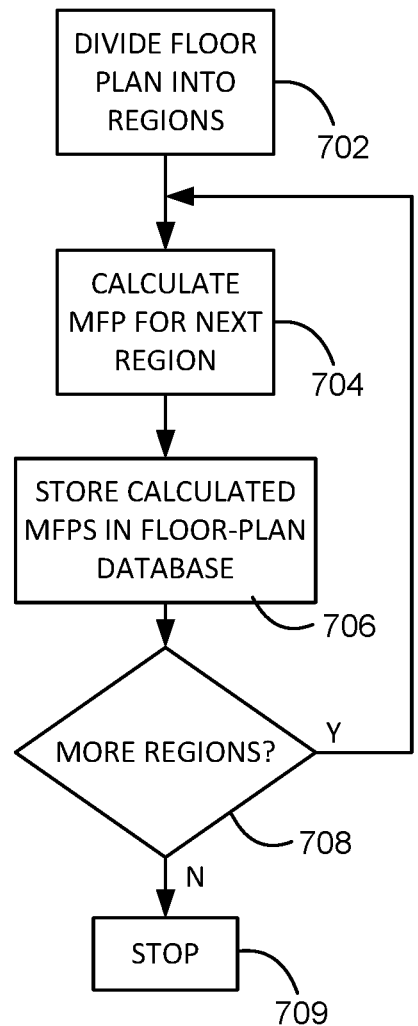
FIG. 7A is a flowchart of an example procedure to generate an augmented floor-plan.
Figure 7B:
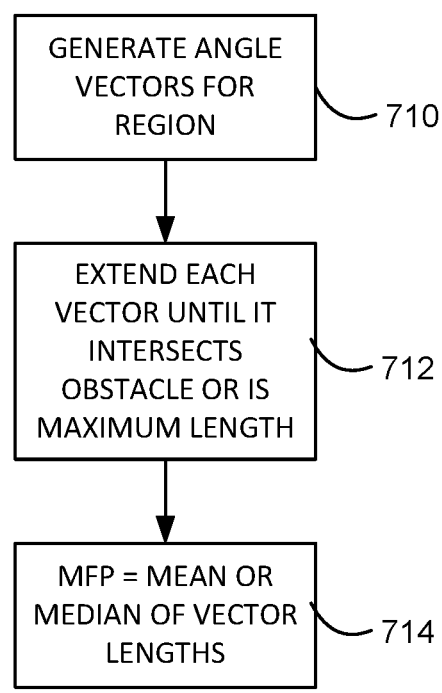
FIG. 7B is a flowchart of an example procedure to generate mean-free-path (MFP) scores.

FIGS. 7A, 7B are flow-chart diagrams that describe the generation of mean-free-path (MFP) scores and the generation of floor-plans augmented by MFP scores by a mobile device and/or location server. As described above, the MFP score for a region or a hypothetical location may be generated as the region is encountered during particle filter processing or MFP scores may be generated for all regions in advance and may be added to the floor-plan to create an augmented floor-plan. FIG. 7A describes the generation of the augmented floor-plan while FIG. 7B describes the generation of an MFP score for an individual region or location.

Some implementations use an augmented floor-plan in which the floor-plan is first divided into regions and then each region is augmented with an obstacle indication (either MPF or cardinal axes). In other embodiments, the floor-plan may be divided into regions but not augmented with obstacle indication values. In yet other implementations, the floor-plan may not be divided into regions. Thus, the process shown in FIG. 7B may be invoked: 1) as a part of the generation of an augmented floor-plan, 2) during a location determination process using a particle filter or a cost function with a floor-plan divided into regions or 3) during a location process using a particle filter or a cost function with a floor-plan that is not divided into regions. It may also be invoked in the processing of a cost function based on MFP scores, as more particularly described below with reference to FIG. 10.

In FIG. 7A, the first operation/step, 702, is to divide the floor-plan into regions. This is illustrated by the vertical divisions 306 and horizontal divisions 308 shown in FIG. 3. These divisions divide the floor-plan into multiple regions 302, each of which is assigned an MFP score 304, as described above. In the example shown in FIG. 3, each region may have a size of approximately four square meters although both larger and smaller regions are contemplated. As described below with reference to FIG. 8, the floor-plan may be divided into regions having different sizes using a quad-tree algorithm so that each region has no more than a maximum number of obstacle edges.

At operation 704, the location server 212 may calculate the MFP score for each region. The process shown in FIG. 7A, starts with a first region of the floor-plan and steps through each region. At operation 706, the MFP score for the current region is stored by the location server 212 in the floor-plan database. At operation 708, if more regions are to be processed, the MFP score may be calculated by the location server 212 for the next region at operation 704. The calculated score may be stored by the location server 212, at operation 706, directly into the defined region of the floor-plan in the floor-plan database or it may be normalized to be between zero and one, once all of the MFP scores have been calculated, and then stored into the defined region of the floor-plan database. If there are no more regions, the location server 212 terminates the process at operation 709.

Figure 9:
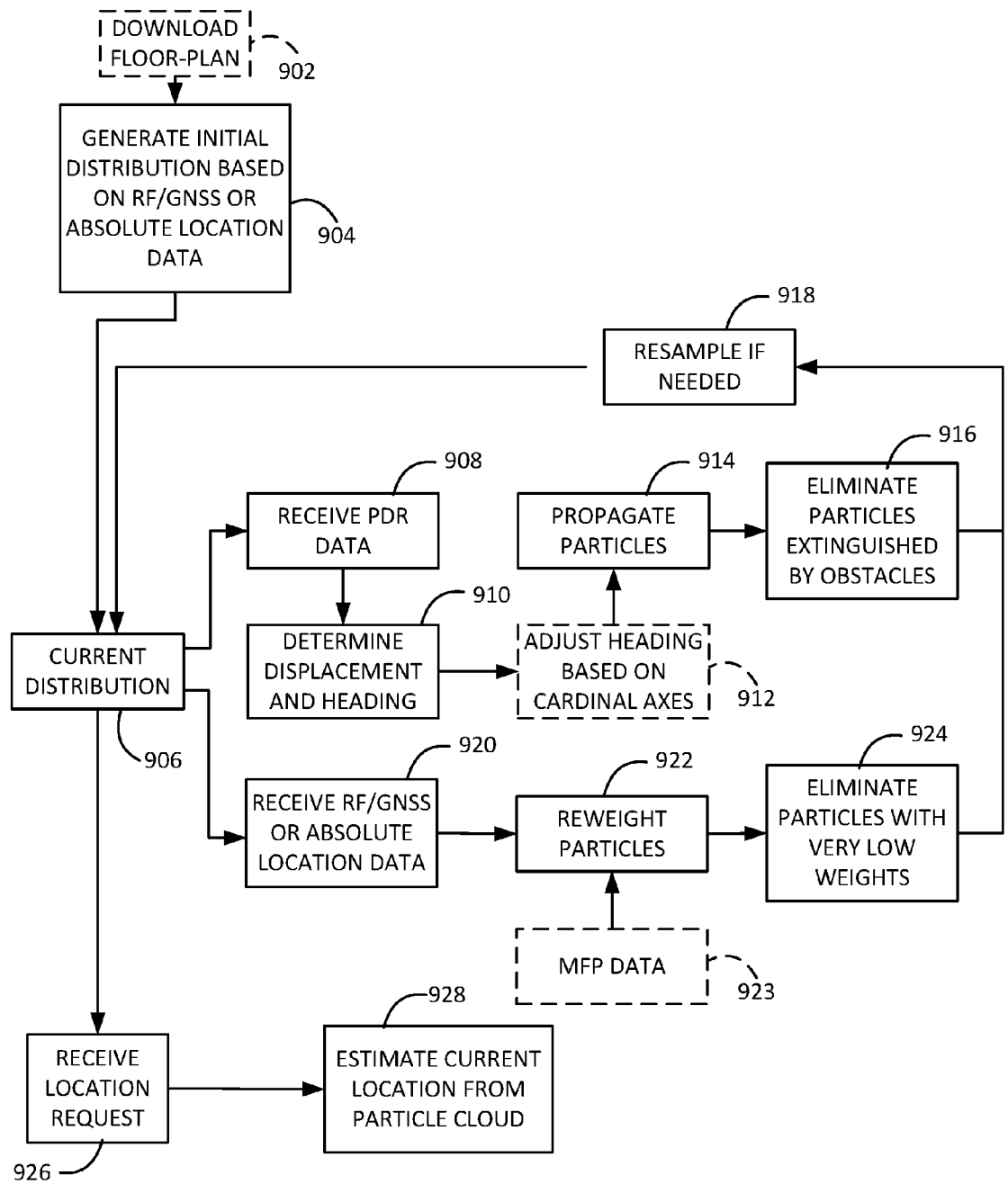
FIG. 9 is a flowchart of an example location process that uses a particle filter, and either MFP scores, or cardinal axes, or both.
Figure 10:
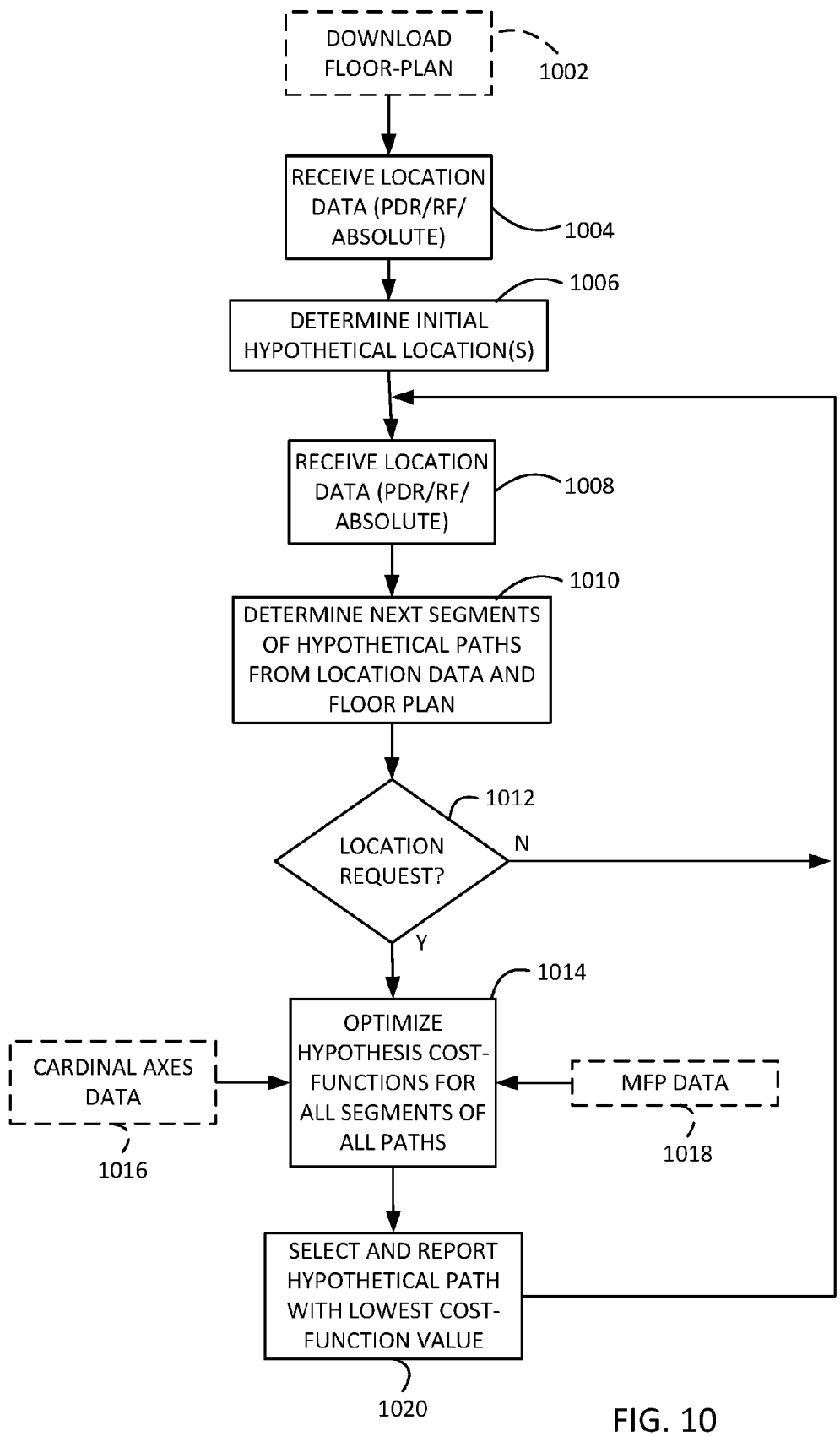
FIG. 10 is a flowchart of an example procedure to determine a current location of a mobile device using one or more cost functions.

FIG. 7B shows details of the method used (e.g., by the location server 212, or by a mobile device such as the mobile device 210) at operation 704 of FIGS. 7A, 9 and 10 to calculate the MFP score. At operation 710, multiple vectors are generated extending from a central point in the region or from a target hypothetical location and spanning a range of angles from 0 to $2\pi$ radians. Each of these vectors defines a free path. The free paths may be separated by an angle, for example, between $\pi/2$ and $\pi/16$ radians. At operation/step 712, each free path vector is then extended in the floor-plan either until it encounters an obstacle or reaches a predetermined maximum length. The maximum length may be between 0.5 and 50 meters such that if the length of the path is greater than the maximum value (i.e. no obstacle is encountered in tracing a ray from the center point along a particular angle), the length of the path for that angle is set to the maximum value. When the lengths of the paths have been determined, the MFP score is computed by either averaging the lengths of the paths or by determining the median length of the paths (at operation 714).

Figure 8:
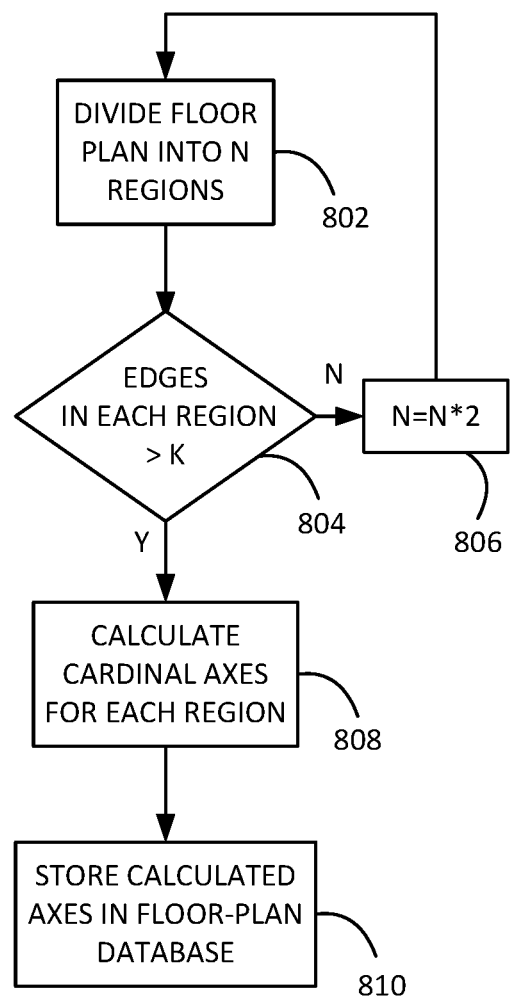
FIG. 8 is a flowchart of an example procedure to generate an augmented floor-plan including cardinal axes.

FIG. 8 is a flowchart of a procedure to generate an augmented floor-plan including cardinal axes. In operation 802, the floor-plan is divided into N regions, and in operation 804 a determination is made whether the number of edges in each region is less than K. In some embodiments, the value K may be an integer between one (1) and ten (10). If the number of edges in the region is greater than K, then the value of N is doubled (at operation 806) and control is transferred to operation 802 to further divide the floor-plan into regions. While the flowchart shown in FIG. 8 divides the floor-plan into equal-size regions, it is contemplated that individual regions may be subdivided. This may be implemented, for example, using a recursive process/algorithm, such as a quad-tree, that divides the venue into four regions, determines the number of edges in each region, and only if a region has more than K edges is it divided into four (or some other number) more regions, each of which is also tested to determine if it has more than K edges.

Once the venue has been divided into regions, the cardinal axes for each region may be computed (in operation/step 808) according to the procedures described herein (e.g., with reference to Equation (2)). These calculations may be applied to the edges in the region or to the closest edges to the hypothetical location being processed if the floor-plan is not divided into regions. Even when the floor-plan has been divided into regions, these calculations may be extended to take into account edges in regions surrounding the current region. After the cardinal axes have been derived for each region, they may be stored into the defined region of the floor-plan database (in operation 810).

FIG. 9 describes a location process that uses a particle filter and either MFP scores or cardinal axes or both. As described above, the process may be implemented at a location server, such as the location server 212, and/or at a mobile device, such as the mobile device 210. The location server 212 or the mobile device 210 may also use a floor-plan that has been divided into regions and augmented with MFP scores or it may calculate the MFP score for each region or hypothetical location as it is encountered during the filter processing. Optional operation 902 is used when the process is implemented in the mobile device 210. In this step, the mobile device 210 obtains (e.g., downloads) at least a portion of the floor-plan from the location server 212. This floor-plan may or may not be segmented or augmented as described above with reference to FIGS. 7A and 7B.

In the next operation/step, 904, the location server 212 or the mobile device 210 generates an initial distribution describing the state (e.g. location, velocity, acceleration and heading) of the mobile device. This distribution may be generated from RF or GNSS data or using other data that provides an estimate of the location (location fix) of the mobile device. The RF data may be processed using trilateratation, triangulation, fingerprinting, round-trip time, angle of arrival (AOA) and/or weighted centroid processes/techniques/algorithms, as described herein. Each of these approaches provides a location and a measure of uncertainty of the location. The operations 904 may, for example, generate a multivariate Gaussian distribution in which the mean values of the state parameters are used as mean values and the uncertainties may be used to generate a covariance matrix. The distribution is then sampled (this may be performed at the location server 212 or at the mobile device 210) to provide the particles of the particle filter. The sampled distribution is indicated as box/operation 906 in FIG. 9.

At operation 908, the location server 212 or the mobile device 210 receives, for example, PDR sensor data which may be processed to update the current state of the mobile device as it moves along a path. Data may be processed by the location server 212 or in the mobile device 210 as it is received or it may be stored with an indication of the instant at which it was collected and provided as a data set describing a path over several instants (i.e., data corresponding to different time instants, or epochs, are collected over some time period defined by the several instants). The PDR sensor data, which may include, for example, accelerometer data, gyroscope data, magnetometer data and pedometer data, defines a displacement, velocity, acceleration and heading of the mobile device. As described above, in a particle filter environment, this process may determine a displacement and heading for the mobile device in operation/step 910 and, based on these values, change the mean location of the sampled distribution by propagating the particles of the particle filter along the floor-plan based on the displacement and heading at operation 914. If any particle encounters an obstacle while moving the displacement amount along the determined heading, that particle is extinguished (e.g., by the location server 212 or the mobile device 210) in operation 916.

Optional operation 912 is executed (either by the location server 212 or by the mobile device 210) between operations 910 and 914 when the obstacle indication for the current particle location or for the regions currently occupied by the particles are evaluated using cardinal axes. In operation 912, the heading value calculated from the most recently received PDR data is compared to the cardinal axes. In some embodiments, if the absolute value of the difference between the determined heading and one of the cardinal axes is less than a threshold value, for example between $\pi/12$ and $\pi/6$ radians, the heading is conformed, e.g., by averaging the determined heading with the axis or by adjusting the heading so that it coincides with the axis (i.e. snapping the heading to the cardinal axis). This adjustment has the effect of preventing or inhibiting particles that have headings which may veer into an obstacle from being extinguished and causing particles that are approaching an obstacle at, for example, an oblique angle to be extinguished more quickly.

After the particles have been extinguished, the distribution may be re-sampled, at 906, if too few particles remain in the sampled distribution or if the remaining particles are in separated clusters.

As further shown in FIG. 9, the location server 212 or the mobile device 210, may also receive, at 920, RF/GNSS data or other data from which a location fix for the mobile device 210 may be calculated. The position data may be used to update the distribution by reweighting the particles at operation 922. Using the same notation as in equation (1), the particles weights at epoch t are given by equation (16)

$$w_t^i = \frac{p(x_{0:t}^i | z_{1:t})}{q(x_{0:t}^i | z_{1:t})} \quad (16)$$

where $q(x_{0:t}^i | z_{1:t})$ is an importance density function that defines how the distribution is sampled. When the distribution is resampled, the importance density function may be the prior as shown in equation (17).

$$q(x_t | x_{t-1}^i, z_t) = p(x_t | x_{t-1}^i) \quad (17)$$

It is contemplated, however, that other importance density functions may be used, as described in the above-referenced article.

In addition, when the obstacle indication values include MFP data, the weight for each particle may be multiplied by a factor, for example, of $e^{-ds}$, where d represents the displacement and s represents the MFP score for the region containing the particle. Thus, the weight may be given by equation (18).

$$w_t^i = \frac{p(x_{0:t}^i | z_{1:t})}{q(x_{0:t}^i | z_{1:t})} e^{-ds} \quad (18)$$

These weights have the effect, in some embodiments, of increasing the probability of particles in parts of the floor-plan having more obstacles relative to parts that have fewer obstacles, counteracting the bias, as described herein, in the Bayesian model that favors particles in regions with fewer obstacles. After the reweighting, particles with low weights are eliminated at 924. After operation 924, control is transferred to operation 918, described above, to resample the distribution if needed.

With continued reference to FIG. 9, when a location request is received, at 926, the location of the mobile device may be determined from the particle cloud (at 928) as represented by the current distribution. The state may be determined as: 1) the state of the particle having the greatest probability, 2) an average on N particles having the greatest probabilities, or 3) a state at the mean of the distribution. As described herein, the example state may include a location, velocity acceleration and heading. At operation 928, the location of the state may be adjusted to a new location according to a projected displacement using the velocity, acceleration and heading over a time interval since the distribution was last updated.

With reference now to FIG. 10, a flowchart diagram is provided showing how one or more cost functions may be used (e.g., by the location server 212 or the mobile device 210) to determine the current location of the mobile device. At operation/step 1002, in implementations in which the location process is executed, for example, by the mobile device 210, the mobile device obtains (e.g., downloads) at least a portion of the floor-plan (e.g., from a location server such as the location server 212). At operation 1004, location data is received. This location data may include PDR data, RF data, or other location data (that may be associated with some degree of uncertainty). In step/operation 1006, one or more hypothetical locations are determined based on the received location data. When only PDR data is available, or when the location data is associated with a relatively large uncertainty, it may be difficult to determine the starting location of the mobile device. Where location fix data is available, the starting location may be at various locations within the uncertainty defined for the location fix data. If, for example, the uncertainty data crosses an obstacle, for example, a wall, hypothetical starting locations may be placed on either side of the wall.

Once the initial hypothetical location(s) has been determined, location data is received at 1008, and then processed at 1010 to determine a next segment of the one or more hypothetical paths between the current hypothetical location(s) and the previous location(s). As an alternative to processing the location data sets to determine successive segments of the one or more hypothetical paths, the successive location data sets may be stored and applied to a cost function process when a current location of the mobile device is requested. At operation 1012, if a request for the current location of the mobile device has not been received, the next location data set is obtained at operation 1008.

If a location request has been received (at 1012), the cost function(s) is generated from the hypothetical path(s) and optimized (at 1014) to identify at least a local minimum hypothetical path, the end point of which corresponds to the current location of the mobile device.

Many different cost functions may be used in the process. Example cost functions are provided by equations (12), (14) and (15) above. The cost function may be differentiated and optimized using one or more methods including conjugate gradient descent, a downhill simplex, simulated annealing or a genetic optimization algorithm to minimize the cost function value(s). As described herein, equation (12) may be used as the cost function when the obstacle indication data includes MFP data 1018, either as a part of an augmented floor-plan, as a dynamic calculation based on the hypothetical locations at each step in the hypothetical path(s) or as region(s) crossed by the segments of the hypothetical path(s). The cost function of equation (14) may be used when the obstacle indication values include cardinal axes data (as depicted at 1016). As with the MFP data 1018, the cardinal axes data 1016 may be part of an augmented floor-plan or it may be calculated dynamically for each hypothetical location or for each region crossed by each segment of each hypothetical path. Alternatively, the cost function of equation (15) incorporating both the MFP and cardinal axis data may be used to determine the current location of the mobile device.

The location determined by minimizing the cost function(s) of the hypothetical path(s) is provided (at 1020) as the current location of the mobile device. Subsequently, a location data set is received (at 1008) that is used to define the next segment in the hypothetical path(s).

As described herein, the addition of the MFP scores and/or cardinal axes to the navigation system removes the bias against areas where the movement of the mobile device may be restricted. The described automated navigation methods and processes automatically take into account the particular floor-plan of a venue that may otherwise require manual specification of customized navigation parameters.

Figure 11:
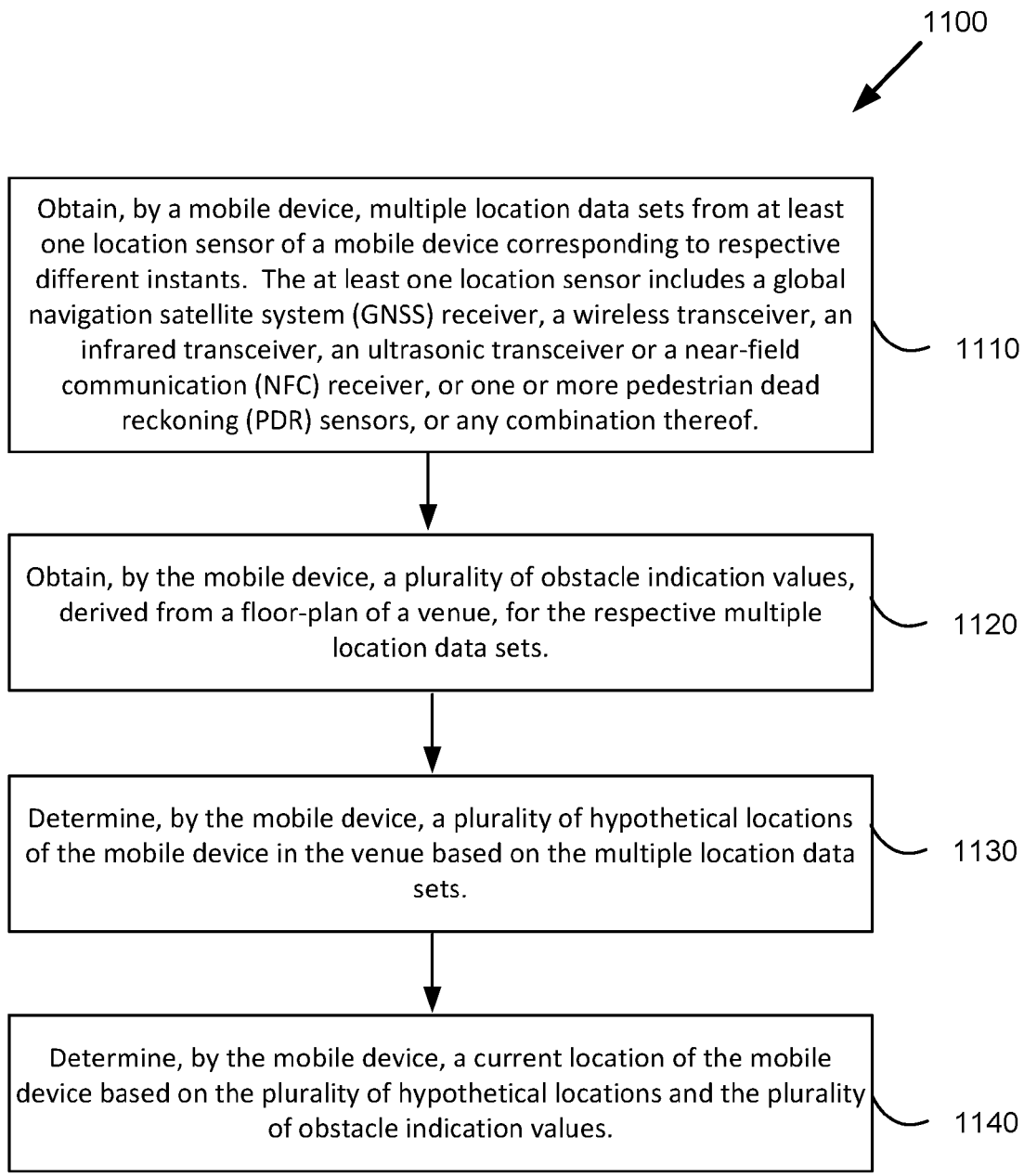
FIG. 11 is a flowchart of an example procedure to determine location of a mobile device.

With reference now to FIG. 11, a flowchart of a further example procedure 1100 to determine location for a mobile device (such as the mobile device 210 depicted, for example, in FIGS. 2 and 5) is shown. At least some of the functions/operations/steps of the procedure 1100 may be similar to functions/operations/steps shown with respect to FIGS. 9 and 10. The procedure 1100 includes obtaining 1110, by the mobile device, multiple location data sets from at least one location sensor of a mobile device, with the multiple location data sets corresponding to respective different instants. Generally, a location sensor senses/measures data corresponding to a particular location data set at a particular time instant. In some embodiments, e.g., in implementations where a particle filter is used to determine location of the mobile device, the particle filter absorbs data sets one at a time to propagate or reweight the particle cloud, and does not use the data set thereafter. The at least one location sensor of the mobile device includes, for example, a global navigation satellite system (GNSS) receiver, a wireless transceiver, an infrared transceiver, an ultrasonic transceiver or a near-field communication (NFC) receiver, and/or one or more pedestrian dead reckoning (PDR) sensors. Other types of location sensors may also be possible. The procedure 1100 also includes obtaining 1120, by the mobile device, a plurality of obstacle indication values, derived from a floor-plan of a venue, for the respective multiple location data sets. In some embodiments, the plurality of obstacle indication values may include values such as mean-free-path (MFP) scores representative of a measure of proximity of at least one of obstacles in the floor-plan to a hypothetical location for the mobile device, and/or cardinal axes data representative of respective cardinal axes in a portion of a floor-plan with the cardinal axes being approximately parallel to, or perpendicular to, at least one edge of at least obstacle in the portion of the floor-plan. The plurality of obstacle indication values may be determined, either locally at the mobile device, or at a remote server (e.g., a location server), based on floor-plan data for the venue. When determined remotely, the determined/computed obstacle indication values are transmitted (generally through a wireless channel) to the mobile device.

Having obtained the multiple location data sets and the plurality of obstacle indication values, a plurality of hypothetical locations of the mobile device in the venue is determined 1130 based on the multiple location data sets. Optionally, the current location of the mobile device is subsequently determined 1140 based on the plurality of hypothetical locations and the plurality of obstacle indication values, e.g., as a final operation in the process of collecting location sensor data and obstacle indication values (performed, for example, at operations 1110 and 1120) and the determination of hypothetical locations (performed, for example, at operation 1130).

As noted, in some implementations, the current location of the mobile device may be determined by applying a particle filter to the plurality of hypothetical locations (included in a plurality of hypothetical states) to generate a probability distribution over the plurality of hypothetical states. In such embodiments, applying the particle filter may include determining an initial one of the plurality of hypothetical states of the mobile device from an initial location data set of the multiple location data sets, with the initial location data set providing an initial absolute location (location fix) and an uncertainty relative to the initial absolute location, modeling the initial absolute location and uncertainty as an initial probability distribution, sampling the initial probability distribution to define a plurality of particles as the plurality of hypothetical states, and applying the particle filter to the defined plurality of particles to propagate the plurality of particles through the floor-plan based on location data sets subsequent to the initial location data set. Additionally, when the plurality of obstacle indication values include MFP scores, respective weights for each of the plurality of particles are determined, with each of the weights including a respective MFP score for a respective subsequent location data set corresponding to the respective one of the plurality of particles, and an updated probability distribution of a state of the mobile device is generated from the propagated and weighted plurality of particles. When the plurality of obstacle indication values, includes cardinal axes data (representative of respective cardinal axes in a portion of the floor-plan including the respective ones of the plurality of hypothetical locations, with the cardinal axes being approximately parallel to, or perpendicular to, at least one edge of at least obstacle in the portion of the floor-plan), heading values indicated by the subsequent location data sets are corrected to conform to the respective cardinal axes for respective portions of the floor-plan corresponding to the subsequent location data sets, respective weights are determined for each of the plurality of particles, and an updated probability distribution of the state of the mobile device is determined from the propagated and weighted plurality of particles.

As further noted, in some embodiments, the current location of the mobile device may be determined by optimizing at least one cost function defined based on the plurality of hypothetical locations and the plurality of obstacle indication values, and determining the current location of the mobile device based on a smallest cost value determined from the optimized at least one cost function. In such embodiments, when the plurality of obstacle indication values includes MFP scores, optimizing the at least one cost function may include determining at least one initial hypothetical location of the mobile device from an initial location data set of the multiple location data sets, with the initial location data set providing an initial absolute location and an uncertainty relative to the initial absolute location, applying the multiple location data sets to the at least one initial hypothetical location to define at least one hypothetical path through the floor-plan (the at least one hypothetical path generated based on the plurality of hypothetical locations) and to define at least one cost function term, of the at least one cost function, for each of the at least one hypothetical path based on the MFP scores and the respective ones of the multiple location data sets corresponding to the at least one hypothetical path. The at least one cost function is optimized to determine at least one cost value for the at least one hypothetical path. When the plurality of obstacle indication values includes cardinal axes data, optimizing the at least one cost function may include determining at least one initial hypothetical location of the mobile device from an initial location data set of the multiple location data sets, with the initial location data set providing an initial absolute location and an uncertainty relative to the initial absolute location, applying the multiple location data sets to the at least one initial hypothetical location to define at least one hypothetical path through the floor-plan (the at least one hypothetical path generated based on the plurality of hypothetical locations) and to define at least one cost function term, of the at least one cost function, for each of the at least one hypothetical path based on the cardinal axes data for the plurality of hypothetical locations, and optimizing the at least one cost function to determine at least one cost value of the at least one hypothetical path.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods.

While the terms "first" and "second" are used herein to describe data transmission associated with a SIM and data receiving associated with a different SIM, such identifiers are merely for convenience and are not meant to limit various embodiments to a particular order, sequence, type of network or carrier.

The various illustrative logical blocks, resources, circuits, and operations described in connection with various embodiments disclosed herein may be implemented as electronic hardware, computer software, or combinations of both. To clearly illustrate this interchangeability of hardware and software, various illustrative components, blocks, resources, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, resources, and circuits described in connection with the aspects disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary embodiment, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in processor-executable software which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

As used herein, a mobile device or station (MS) refers to a device such as a cellular or other wireless communication device, a smartphone, tablet, personal communication system (PCS) device, personal navigation device (PND), Personal Information Manager (PIM), Personal Digital Assistant (PDA), laptop or other suitable mobile device which is capable of receiving wireless communication and/or navigation signals, such as navigation positioning signals. The term "mobile station" (or "mobile device" or "wireless device") is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, tablet devices, etc., which are capable of communication with a server, such as via the Internet, WiFi, or other network, and to communicate with one or more types of nodes, regardless of whether satellite signal reception, assistance data reception, and/or position-related processing occurs at the device, at a server, or at another device or node associated with the network. Any operable combination of the above are also considered a "mobile station." A mobile device may also be referred to as a mobile terminal, a terminal, a user equipment (UE), a device, a Secure User Plane Location Enabled Terminal (SET), a target device, a target, or by some other name.

While some of the techniques, processes, and/or implementations presented herein may comply with all or part of one or more standards, such techniques, processes, and/or implementations may not, in some embodiments, comply with part or all of such one or more standards.

Further Subject Matter/Embodiments of Interest

The following recitation is drawn to additional subject matter that may be of interest and which is also described in detail herein along with subject matter presented in the initial claims presently presented herein:

A1—A location server comprising: memory to store a floor-plan database including a floor-plan of a venue program; and a processor, coupled to the memory, and configured to: divide the floor-plan into a plurality of regions; identify obstacles in or closest to each region; and assign a respective value to each region, each value representing a measure of navigability of the region in view of the obstacles in or closest to the region.

A2—The location server recited in subject matter example A1, wherein the processor is configured to: determine a mean-free-path (MFP) length in the region by determining respective free-path lengths of a plurality of angularly separated paths originating at a center of the region; and determine one of a mean or a median of the free-path lengths as the value representing the measure of navigability of the region.

A3—The location server recited in the subject matter example A1, wherein the processor is configured to determine respective cardinal axes in each region, the respective cardinal axes being approximately parallel to, or perpendicular to, at least one edge of at least one of the obstacles in or closest to the each region.

While example implementations have been illustrated and described herein, it is contemplated that various modifications may be made in the details within the scope and range of equivalents of the claims.

What is claimed:
1. A mobile device, comprising:
a processor;
a wireless transceiver;
at least one location sensor comprising a global navigation satellite system (GNSS) receiver, the wireless transceiver,
an infrared transceiver, an ultrasonic transceiver or a near-field communication (NFC) receiver, or
one or more pedestrian dead reckoning (PDR) sensors, or any combination thereof; and
memory comprising a floor-plan of a venue,
wherein the processor is configured to:
obtain multiple location data sets representing respective different instants from the at least one location sensor of the mobile device;
obtain a plurality of obstacle indication values, wherein each of the plurality of obstacle indication values, for each of the multiple location data sets, is derived from the floor-plan;
determine a plurality of hypothetical locations of the mobile device in the venue based on the multiple location data sets; and
determine a current location of the mobile device based on the plurality of hypothetical locations and the plurality of obstacle indication values;
wherein the plurality of obstacle indication values for the multiple location data sets include:
respective mean-free-path (MFP) scores, determined based on the floor-plan, for the plurality of hypothetical locations, each MFP score including a respective measure of proximity of at least some of obstacles in the floor-plan to a respective hypothetical location, or
cardinal axes data describing respective cardinal axes in a portion of the floor-plan corresponding to the respective ones of the multiple location data sets,
the cardinal axes being approximately parallel to, or perpendicular to, at least one edge of at least one obstacle in the portion of the floor-plan.

2. The mobile device of claim 1, wherein the wireless transceiver comprises a WiFi transceiver, a Bluetooth transceiver, an ultra-wideband (UWB) transceiver, a Zigbee transceiver, a near-field communication (NFC) transceiver, or a cellular transceiver, or any combination thereof.

3. The mobile device of claim 1, wherein the processor configured to determine the current location of the mobile device is configured to:
apply a particle filter to a plurality of hypothetical states, wherein the plurality of hypothetical states comprise the plurality of hypothetical locations of the mobile device;
generate a probability distribution over the plurality of hypothetical states and the plurality of obstacle indication values; and
determine the current location of the mobile device from the generated probability distribution.

4. The mobile device of claim 3, wherein the processor configured to apply the particle filter and determine the current location of the mobile device is configured to:
determine an initial one of the plurality of hypothetical states of the mobile device from an initial location data set of the multiple location data sets, the initial location data set providing an initial absolute location and an uncertainty relative to the initial absolute location;
model the initial absolute location and uncertainty as an initial probability distribution;
sample the initial probability distribution to define a plurality of particles as the plurality of hypothetical states;
apply the particle filter to the defined plurality of particles to propagate the plurality of particles through the floor-plan based on location data sets subsequent to the initial location data set;
determine respective weights for each of the plurality of particles, each of the weights including a respective MFP score for a respective subsequent location data set corresponding to the respective one of the plurality of particles;
determine an updated probability distribution of a state of the mobile device from the propagated and weighted plurality of particles; and
determine the current location of the mobile device based on the updated probability distribution of the state of the mobile device.

5. The mobile device of claim 3, wherein the processor configured to apply the particle filter and determine the current location of the mobile device is configured to:
determine an initial hypothetical state of the mobile device from an initial location data set of the multiple location data sets that provides an initial absolute location and an uncertainty relative to the initial absolute location;
model the initial absolute location and uncertainty as an initial probability distribution;

sample the initial probability distribution to define a plurality of particles as the plurality of hypothetical states;
apply the particle filter to the defined plurality of particles to propagate the plurality of particles through the floor-plan based on location data sets subsequent to the initial location data set, wherein heading values indicated by the subsequent location data sets are corrected to conform to respective cardinal axes for respective portions of the floor-plan corresponding to the subsequent location data sets;
determine respective weights for each of the plurality of particles;
determine an updated probability distribution of a state of the mobile device from the propagated and weighted plurality of particles; and
determine the current location of the mobile device based on the updated probability distribution of the state of the mobile device.

6. The mobile device of claim 1, wherein the processor configured to determine the current location of the mobile device based on the plurality of hypothetical locations and the plurality of obstacle indication values is configured to:
optimize at least one cost function defined based on the plurality of hypothetical locations and the plurality of obstacle indication values.

7. The mobile device of claim 6, wherein the processor configured to optimize the at least one cost function is configured to:
determine at least one initial hypothetical location of the mobile device from an initial location data set of the multiple location data sets, the initial location data set providing an initial absolute location and an uncertainty relative to the initial absolute location;
apply the multiple location data sets to the at least one initial hypothetical location to define at least one hypothetical path through the floor-plan, the at least one hypothetical path generated based on the plurality of hypothetical locations, and to define at least one cost function term, of the at least one cost function, for each of the at least one hypothetical path based on the MFP scores and the respective ones of the multiple location data sets corresponding to the at least one hypothetical path;
optimize the at least one cost function to determine at least one cost value for the at least one hypothetical path; and
determine the current location of the mobile device as an end point of a hypothetical path with a lowest cost value.

8. The mobile device of claim 7, wherein the processor configured to optimize the at least one cost function and determine the current location of the mobile device is configured to:
determine at least one initial hypothetical location of the mobile device from an initial location data set of the multiple location data sets, the initial location data set providing an initial absolute location and an uncertainty relative to the initial absolute location;
apply the multiple location data sets to the at least one initial hypothetical location to define at least one hypothetical path through the floor-plan, the at least one hypothetical path generated based on the plurality of hypothetical locations, and to define at least one cost function term, of the at least one cost function, for each of the at least one hypothetical path based on the cardinal axes data for the multiple location data sets used to define the at least one hypothetical path;
optimize the at least one cost function to determine at least one cost value for the at least one hypothetical path; and
determine the current location of the mobile device as an end point of a hypothetical path with a lowest cost value.

9. The mobile device of claim 1, wherein the wireless transceiver of the mobile device is configured to receive the floor-plan from a location server.

10. The mobile device of claim 1, wherein the floor-plan is divided into a plurality of regions, and wherein each region is associated with a respective one of the plurality of obstacle indication values.

11. A method, comprising:
obtaining, by a mobile device, multiple location data sets from at least one location sensor of a mobile device corresponding to respective different instants,
wherein the at least one location sensor comprises a global navigation satellite system (GNSS) receiver, a wireless transceiver, an infrared transceiver, an ultrasonic transceiver or a near-field communication (NFC) receiver, or one or more pedestrian dead reckoning (PDR) sensors, or any combination thereof;
obtaining, by the mobile device, a plurality of obstacle indication values,
derived from a floor-plan of a venue, for the respective multiple location data sets;
determining, by the mobile device, a plurality of hypothetical locations of the mobile device in the venue based on the multiple location data sets; and
determining, by the mobile device, a current location of the mobile device based on the plurality of hypothetical locations and the plurality of obstacle indication values;
wherein the plurality of obstacle indication values for the multiple location data sets include:
respective mean-free-path (MFP) scores, determined based on the floor-plan,
for the plurality of hypothetical locations, each MFP score including a respective measure of proximity of at least some of obstacles in the floor-plan to a respective hypothetical location, or
cardinal axes data describing respective cardinal axes in a portion of the floor-plan corresponding to the respective ones of the multiple location data sets,
the cardinal axes being approximately parallel to, or perpendicular to, at least one edge of at least one obstacle in the portion of the floor-plan.

12. The method of claim 11, wherein the plurality of hypothetical locations are included in a plurality of hypothetical states of the mobile device, and wherein determining the current location of the mobile device comprises:
applying a particle filter to the plurality of hypothetical states to generate a probability distribution over the plurality of hypothetical states and the plurality of obstacle indication values; and
determining the current location of the mobile device from the generated probability distribution.

13. The method of claim 12, wherein the plurality of obstacle indication values for the plurality of hypothetical locations include mean-free-path (MFP) scores, determined based on the floor-plan, for the plurality of hypothetical locations, each MFP score including a respective measure of proximity of at least one obstacle in the floor-plan to a respective hypothetical location, and wherein applying the particle filter to generate the probability distribution comprises:
determining an initial one of the plurality of hypothetical states of the mobile device from an initial location data set of the multiple location data sets, the initial location data set providing an initial absolute location and an uncertainty relative to the initial absolute location;

modeling the initial absolute location and uncertainty as an initial probability distribution;

sampling the initial probability distribution to define a plurality of particles as the plurality of hypothetical states;

applying the particle filter to the defined plurality of particles to propagate the plurality of particles through the floor-plan based on location data sets subsequent to the initial location data set;

determining respective weights for each of the plurality of particles, each of the weights including a respective MFP score for a respective subsequent location data set corresponding to the respective one of the plurality of particles; and determining, as the generated probability distribution, an updated probability distribution of a state of the mobile device from the propagated and weighted plurality of particles.

14. The method claim 12, wherein each obstacle indication values for the respective ones of the plurality of hypothetical locations is associated with cardinal axes data representative of respective cardinal axes in a portion of the floor-plan including the respective ones of the plurality of hypothetical locations, the cardinal axes being approximately parallel to, or perpendicular to, at least one edge of at least obstacle in the portion of the floor-plan, and wherein applying the particle filter to generate the probability distribution and determining the current location of the mobile device comprises:

determining an initial hypothetical state of the mobile device from an initial location data set of the multiple location data sets that provides an initial absolute location and an uncertainty relative to the initial absolute location;

modeling the initial absolute location and uncertainty as an initial probability distribution;

sampling the initial probability distribution to define a plurality of particles as the plurality of hypothetical states;

applying the particle filter to the defined plurality of particles to propagate the plurality of particles through the floor-plan based on location data sets subsequent to the initial location data set, wherein heading values indicated by the subsequent location data sets are corrected to conform to the respective cardinal axes for respective portions of the floor-plan corresponding to the subsequent location data sets;

determining respective weights for each of the plurality of particles; and determining, as the generated probability distribution, an updated probability distribution of the state of the mobile device from the propagated and weighted plurality of particles.

15. The method of claim 11, wherein determining the current location of the mobile device based on the plurality of hypothetical locations and the plurality of obstacle indication values comprises:

optimizing at least one cost function defined based on the plurality of hypothetical locations and the plurality of obstacle indication values; and determining the current location of the mobile device based on a smallest cost value determined from the optimized at least one cost function.

16. The method of claim 15, wherein the plurality of obstacle indication values for the multiple location data sets include mean-free-path (MFP) scores determined based on the floor-plan, each MFP score including a respective measure of proximity of at least some of obstacles in the floor-plan to one of the plurality of hypothetical locations, and wherein optimizing the at least one cost function comprises:

determining at least one initial hypothetical location of the mobile device from an initial location data set of the multiple location data sets, the initial location data set providing an initial absolute location and an uncertainty relative to the initial absolute location;

applying the multiple location data sets to the at least one initial hypothetical location to define at least one hypothetical path through the floor-plan, the at least one hypothetical path generated based on the plurality of hypothetical locations, and to define at least one cost function term, of the at least one cost function, for each of the at least one hypothetical path based on the MFP scores and the respective ones of the multiple location data sets corresponding to the at least one hypothetical path; and optimizing the at least one cost function to determine at least one cost value for the at least one hypothetical path.

17. The method of claim 15, wherein each of the plurality of obstacle indication values for the plurality of hypothetical locations includes cardinal axes data representative of respective cardinal axes in a portion of the floor-plan including the respective ones of the plurality of hypothetical locations, the cardinal axes being approximately parallel to, or perpendicular to, at least one edge of at least obstacle in the portion of the floor-plan, and wherein optimizing the at least one cost function comprises:

determining at least one initial hypothetical location of the mobile device from an initial location data set of the multiple location data sets, the initial location data set providing an initial absolute location and an uncertainty relative to the initial absolute location;

applying the multiple location data sets to the at least one initial hypothetical location to define at least one hypothetical path through the floor-plan, the at least one hypothetical path generated based on the plurality of hypothetical locations, and to define at least one cost function term, of the at least one cost function, for each of the at least one hypothetical path based on the cardinal axes data for the plurality of hypothetical locations; and optimizing the at least one cost function to determine at least one cost value of the at least one hypothetical path.

18. The method of claim 11 wherein each hypothetical location is associated with a first obstacle indication value indicating a mean-free-path length in a portion of the floor-plan including the hypothetical location, and a second obstacle indication value describing respective cardinal axes in the portion of the floor-plan, the cardinal axes being approximately parallel to, or perpendicular to, at least one edge of at least one object in the portion of the floor-plan.

19. An apparatus comprising:

means for obtaining multiple location data sets representing respective different instants from at least one location sensor of a mobile device, wherein the at least one location sensor comprises a global navigation satellite system (GNSS) receiver, a wireless transceiver, an infrared transceiver, an ultrasonic transceiver or a near-field communication (NFC) receiver, or one or more pedestrian dead reckoning (PDR) sensors, or any combination thereof;

means for obtaining a plurality of obstacle indication values, wherein each of the plurality of obstacle indication values, for each of the multiple location data sets, is derived from a floor-plan of a venue;

means for determining a plurality of hypothetical locations of the mobile device in the venue based on the multiple location data sets; and means for determining a current location of the mobile device based on the plurality of hypothetical locations and the plurality of obstacle indication values;

wherein the plurality of obstacle indication values for the multiple location data sets include:

respective mean-free-path (MFP) scores, determined based on the floor-plan, for the plurality of hypothetical locations, each MFP score including a respective measure of proximity of at least some of obstacles in the floor-plan to a respective hypothetical location, or cardinal axes data describing respective cardinal axes in a portion of the floor-plan corresponding to the respective ones of the multiple location data sets, the cardinal axes being approximately parallel to, or perpendicular to, at least one edge of at least one obstacle in the portion of the floor-plan.

20. The apparatus of claim 19, wherein the means for determining the current location of the mobile device comprises:

means for applying a particle filter to a plurality of hypothetical states, wherein the plurality of hypothetical states comprise the plurality of hypothetical locations of the mobile device;

means for generating a probability distribution over the plurality of hypothetical states and the plurality of obstacle indication values; and means for determining the current location of the mobile device from the generated probability distribution.

21. The apparatus of claim 20, wherein the plurality of obstacle indication values for the multiple location data sets include respective mean-free-path (MFP) scores, determined based on the floor-plan, for the plurality of hypothetical locations, each MFP score including a respective measure of proximity of at least some of obstacles in the floor-plan to a respective hypothetical location, and wherein the means for applying the particle filter and the means for determining the current location of the mobile device comprise:

means for determining an initial one of the plurality of hypothetical states of the mobile device from an initial location data set of the multiple location data sets, the initial location data set providing an initial absolute location and an uncertainty relative to the initial absolute location;

means for modelling the initial absolute location and uncertainty as an initial probability distribution;

means for sampling the initial probability distribution to define a plurality of particles as the plurality of hypothetical states;

means for applying the particle filter to the defined plurality of particles to propagate the plurality of particles through the floor-plan based on location data sets subsequent to the initial location data set;

means for determining respective weights for each of the plurality of particles, each of the weights including a respective MFP score for a respective subsequent location data set corresponding to respective ones of the plurality of particles;

means for determining an updated probability distribution of a state of the mobile device from the propagated and weighted plurality of particles; and means for determining the current location of the mobile device based on the updated probability distribution of the state of the mobile device.

22. The apparatus of claim 20, wherein each of the plurality of obstacle indication values for the respective ones of the multiple location data sets includes data describing respective cardinal axes in a portion of the floor-plan corresponding to the respective ones of the multiple location data sets, the cardinal axes being approximately parallel to, or perpendicular to, at least one edge of at least one obstacle in the portion of the floor-plan, and wherein the means for applying the particle filter and the means for determining the current location of the mobile device comprise:

means for determining an initial hypothetical state of the mobile device from an initial location data set of the multiple location data sets that provides an initial absolute location and an uncertainty relative to the initial absolute location;

means for modelling the initial absolute location and uncertainty as an initial probability distribution;

means for sampling the initial probability distribution to define a plurality of particles as the plurality of hypothetical states;

means for applying the particle filter to the defined plurality of particles to propagate the plurality of particles through the floor-plan based on location data sets subsequent to the initial location data set, wherein heading values indicated by the subsequent location data sets are corrected to conform to respective cardinal axes for respective portions of the floor-plan corresponding to the subsequent location data sets;

means for determining respective weights for each of the plurality of particles;

means for determining an updated probability distribution of a state of the mobile device from the propagated and weighted plurality of particles; and means for determining the current location of the mobile device based on the updated probability distribution of the state of the mobile device.

23. The apparatus of claim 19, wherein the plurality of obstacle indication values for the plurality of hypothetical locations include mean-free-path (MFP) scores determined based on the floor-plan, each MFP score including a respective measure of proximity of at least some of obstacles in the floor-plan to one of the plurality of hypothetical locations, and wherein the means for determining the current location of the mobile device comprises:

means for determining at least one initial hypothetical location of the mobile device from an initial location data set of the multiple location data sets, the initial location data set providing an initial absolute location and an uncertainty relative to the initial absolute location;

means for applying the multiple location data sets to the at least one initial hypothetical location to define at least one hypothetical path through the floor-plan, the at least one hypothetical path generated based on the plurality of hypothetical locations, and to define at least one cost function term, of at least one cost function, for each of the at least one hypothetical path based on the MFP scores and the respective ones of the multiple location data sets corresponding to the at least one hypothetical path;

means for optimizing the at least one cost function to determine at least one cost value for the at least one hypothetical path; and means for determining the current location of the mobile device as an end point of a hypothetical path with a lowest cost value.

24. The apparatus of claim 19, wherein each obstacle indication values for the multiple location data sets includes cardinal axes data representative of respective cardinal axes in a portion of the floor-plan corresponding to the respective one of the multiple location data sets, the cardinal axes being approximately parallel to, or perpendicular to, at least one edge of at least one obstacle in the portion of the floor-plan, and wherein the means for determining the current location of the mobile device comprises:

means for determining at least one initial hypothetical location of the mobile device from an initial location data set of the multiple location data sets, the initial location data set providing an initial absolute location and an uncertainty relative to the initial absolute location;

means for applying the multiple location data sets to the at least one initial hypothetical location to define at least one hypothetical path through the floor-plan, the at least one hypothetical path generated based on the plurality of hypothetical locations, and to define at least one cost function term, of at least one cost function, for each of the at least one hypothetical path based on the cardinal axes data for the multiple location data sets used to define the at least one hypothetical path;

means for optimizing the at least one cost function to determine at least one cost value for the at least one hypothetical path; and means for determining the current location of the mobile device as an end point of a hypothetical path with a lowest cost value.

25. A non-transitory computer readable media programmed with instructions, executable on a processor, to:

obtain multiple location data sets representing respective different instants from at least one location sensor of a mobile device, wherein the at least one location sensor comprises a global navigation satellite system (GNSS) receiver, a wireless transceiver, an infrared transceiver, an ultrasonic transceiver or a near-field communication (NFC) receiver, or one or more pedestrian dead reckoning (PDR) sensors, or any combination thereof;

obtain a plurality of obstacle indication values, wherein each of the plurality of obstacle indication values, for each of the multiple location data sets, is derived from a floor-plan of a venue;

determine a plurality of hypothetical locations of the mobile device in the venue based on the multiple location data sets; and determine a current location of the mobile device based on the plurality of hypothetical locations and the plurality of obstacle indication values;

wherein the plurality of obstacle indication values for the multiple location data sets include:

respective mean-free-path (MFP) scores, determined based on the floor-plan, for the plurality of hypothetical locations, each MFP score including a respective measure of proximity of at least some of obstacles in the floor-plan to a respective hypothetical location, or cardinal axes data describing respective cardinal axes in a portion of the floor-plan corresponding to the respective ones of the multiple location data sets, the cardinal axes being approximately parallel to, or perpendicular to, at least one edge of at least one obstacle in the portion of the floor-plan.

* * * * *